US010761002B1

(12) United States Patent
Foecke et al.

(10) Patent No.: US 10,761,002 B1
(45) Date of Patent: Sep. 1, 2020

(54) SHEAR LOADER AND PERFORMING PURE MODE II OR MIXED MODE I AND MODE II SHEAR LOADING

(71) Applicant: Government of the United States of America, as represented by the Secretary of Commerce, Gaithersburg, MD (US)

(72) Inventors: Timothy J Foecke, Damascus, MD (US); Edward Pompa, Hagerstown, MD (US); Matthias J Merzkirch, Rockville, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 0 days.

(21) Appl. No.: 16/409,946

(22) Filed: May 13, 2019

(51) Int. Cl.
  *G01L 1/00* (2006.01)
  *G01N 3/24* (2006.01)
  *G01L 1/24* (2006.01)

(52) U.S. Cl.
  CPC . *G01N 3/24* (2013.01); *G01L 1/24* (2013.01)

(58) Field of Classification Search
  CPC .................................... G01N 3/24; G01L 1/24
  USPC ........................................................ 73/800
  See application file for complete search history.

(56) References Cited

U.S. PATENT DOCUMENTS

| | | | | |
|---|---|---|---|---|
| 3,969,935 A * | 7/1976 | Shoberg | ................ | G01L 1/2218 73/862.629 |
| 5,253,518 A * | 10/1993 | Steiger | .................. | E21B 49/006 166/250.01 |
| 5,255,562 A * | 10/1993 | Yamamoto | ............... | G01D 1/02 702/157 |
| 5,279,166 A * | 1/1994 | Ward | ....................... | G01N 3/08 73/794 |
| 5,911,164 A * | 6/1999 | McRae | .................... | G01N 3/24 73/815 |
| 6,164,818 A * | 12/2000 | Dick | ........................ | G01K 3/10 374/46 |
| 8,804,132 B1 * | 8/2014 | Saxer | ................. | G01B 9/02098 356/520 |

(Continued)

FOREIGN PATENT DOCUMENTS

DE      102015003689 A1    9/2016
EP            3073244 A1    9/2016

*Primary Examiner* — Max H Noori
(74) *Attorney, Agent, or Firm* — Office of Chief Counsel for National Institute of Standards and Technology

(57) ABSTRACT

A shear loader subjects a shear load on a sample and includes: a first shearer including: a first shearing face that provides a shearing plane; a first mating face; and a first knife edge; a second shearer including: a second shearing face; a second mating face; and a second knife edge, the first shearer and the second shearer having relative motion to provide the shear load to the sample; a first load cell; and a second load cell, the first load cell and the second load cell having relative motion in a load direction that is orthogonal to the shearing plane and orthogonal to the shear direction, such that relative motion of the first load cell and the second load cell along the load direction subjects the sample to a side load along the load direction; and a sample region that receives sample bounded by the mating faces and load faces.

20 Claims, 21 Drawing Sheets

(56) References Cited

U.S. PATENT DOCUMENTS

| | | | |
|---|---|---|---|
| 2014/0033799 A1* | 2/2014 | Newman | G01B 9/02 |
| | | | 73/37 |
| 2015/0040680 A1* | 2/2015 | Gregg | G01N 3/24 |
| | | | 73/842 |
| 2018/0031457 A1* | 2/2018 | Jiang | G01N 3/02 |

* cited by examiner (A)  Mode I (B)  Mode II (C)  Mode III

SHEAR LOADER AND PERFORMING PURE MODE II OR MIXED MODE I AND MODE II SHEAR LOADING

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, Md., 20899; voice (301) 301-975-2573; email tpo@nist.gov; reference NIST Docket Number 18-028US1.

BRIEF DESCRIPTION

Disclosed is a shear loader to produce a shear load on a sample, the shear loader comprising: a first shearer comprising: a first shearing face that provides a shearing plane; a first mating face disposed orthogonal to the first shearing face; and a first knife edge disposed along the shearing plane at an intersection of the first shearing face and the first mating face; a second shearer comprising: a second shearing face disposed along the shearing plane; a second mating face disposed orthogonal to the second shearing face; and a second knife edge disposed along the shearing plane at an intersection of the second shearing face and the second mating face, the first shearer and the second shearer having relative motion in a shear direction that is parallel to the shearing plane to provide the shear load to the sample along the shearing plane; a first load cell disposed on the first mating face of the first shearer and comprising a first load face to contact the sample; a second load cell disposed on the second mating face of the second shearer and comprising a second load face opposingly disposed to the first load face of the first load cell, the first load cell and the second load cell having relative motion in a load direction that is orthogonal to the shearing plane and orthogonal to the shear direction, such that relative motion the first load cell and the second load cell along the load direction subjects the sample to a side load along the load direction; and a sample region that receives sample and that is bounded by the first mating face, the second mating face, the first load face, and the second load face.

Disclosed is a process for performing pure mode II shear loading, the process comprising: receiving a sample in a sample region of the shear loader of claim 1; contacting a first shear face of the sample with the first mating face of the first shearer; contacting a second shear face of the sample with the second mating face of the second shearer; contacting a first load face of the sample with the first load face of the first load cell; contacting a second load face of the sample with the second load face of the second load cell; moving the first shearer relative to the second shearer in a linear direction along the shear direction; and subjecting the sample to the shear load provided by the first knife edge of the first shearer and the second knife edge of the second shearer in an absence of a mode I or mode III force to perform pure mode II shear loading.

Disclosed is a process for performing mixed mode I and mode II shear loading, the process comprising: receiving a sample in a sample region of the shear loader of claim 1; contacting a first shear face of the sample with the first mating face of the first shearer; contacting a second shear face of the sample with the second mating face of the second shearer; contacting a first load face of the sample with the first load face of the first load cell; contacting a second load face of the sample with the second load face of the second load cell; moving the first shearer relative to the second shearer in a linear direction along the shear direction; subjecting the sample to the shear load provided by the first knife edge of the first shearer and the second knife edge of the second shearer; and subjecting the sample to the side load provided by the first load cell and the second load cell to perform mixed mode I and mode II shear loading.

BRIEF DESCRIPTION OF THE DRAWINGS

The following description should not be considered limiting in any way. With reference to the accompanying drawings, like elements are numbered alike.

DETAILED DESCRIPTION

A detailed description of one or more embodiments is presented herein by way of exemplification and not limitation.

It has been discovered that a shear loader subjects a load to a material or joint in pure shear and measures a force, stress, or strength; deformation or strain and elastic modulus; and shear strain to failure. The shear loader determines an exact mode of loading during a duration of a test and selectively subjects the sample to a mixed mode I and mode II loading. Further, the shear loader tests a strength of an adhesive joint, solid state weld, spot weld, an interlayer strength, or fracture toughness of a sample such as a polymer hybrid composite.

Figure 1:
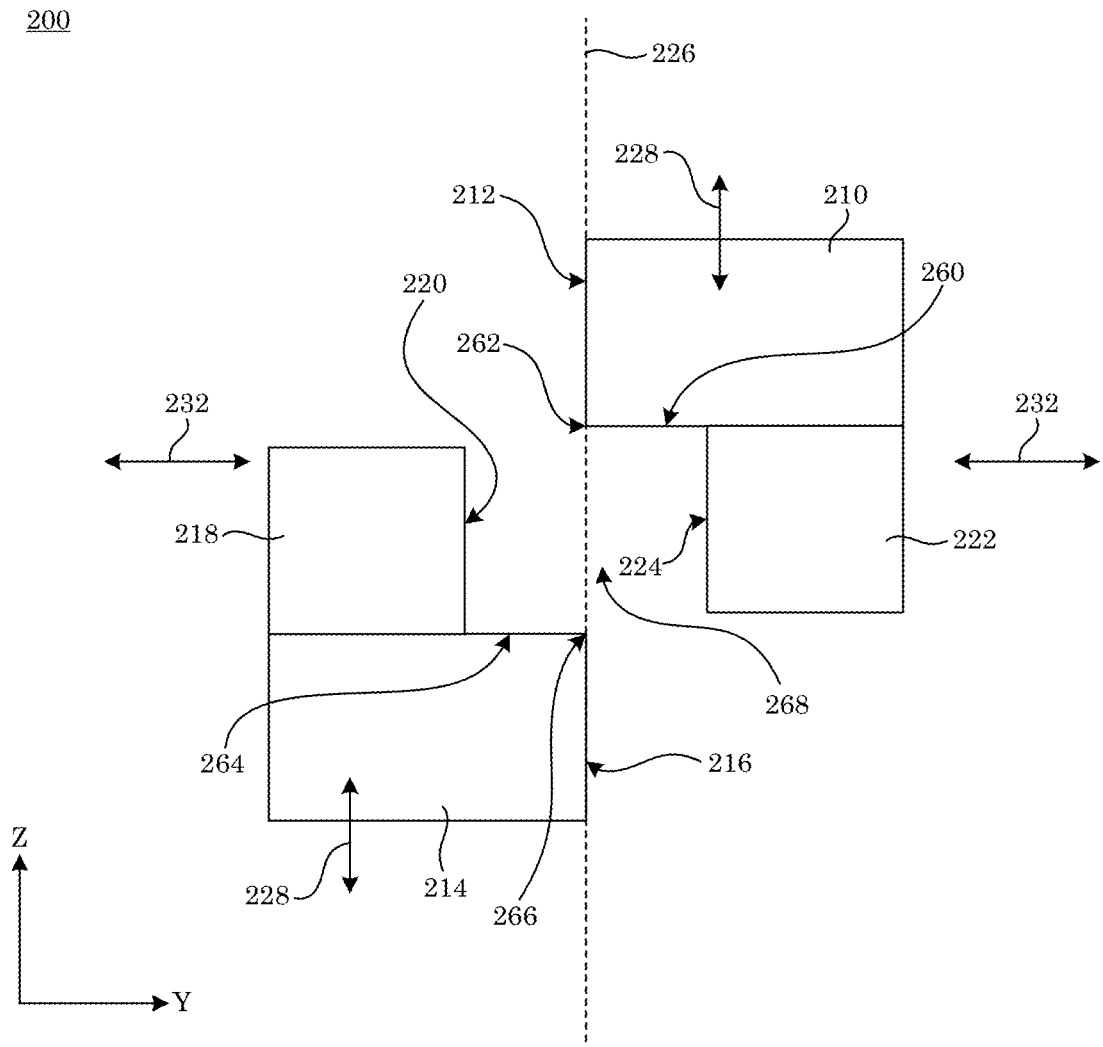
FIG. 1 shows a shear loader.
Figure 2:
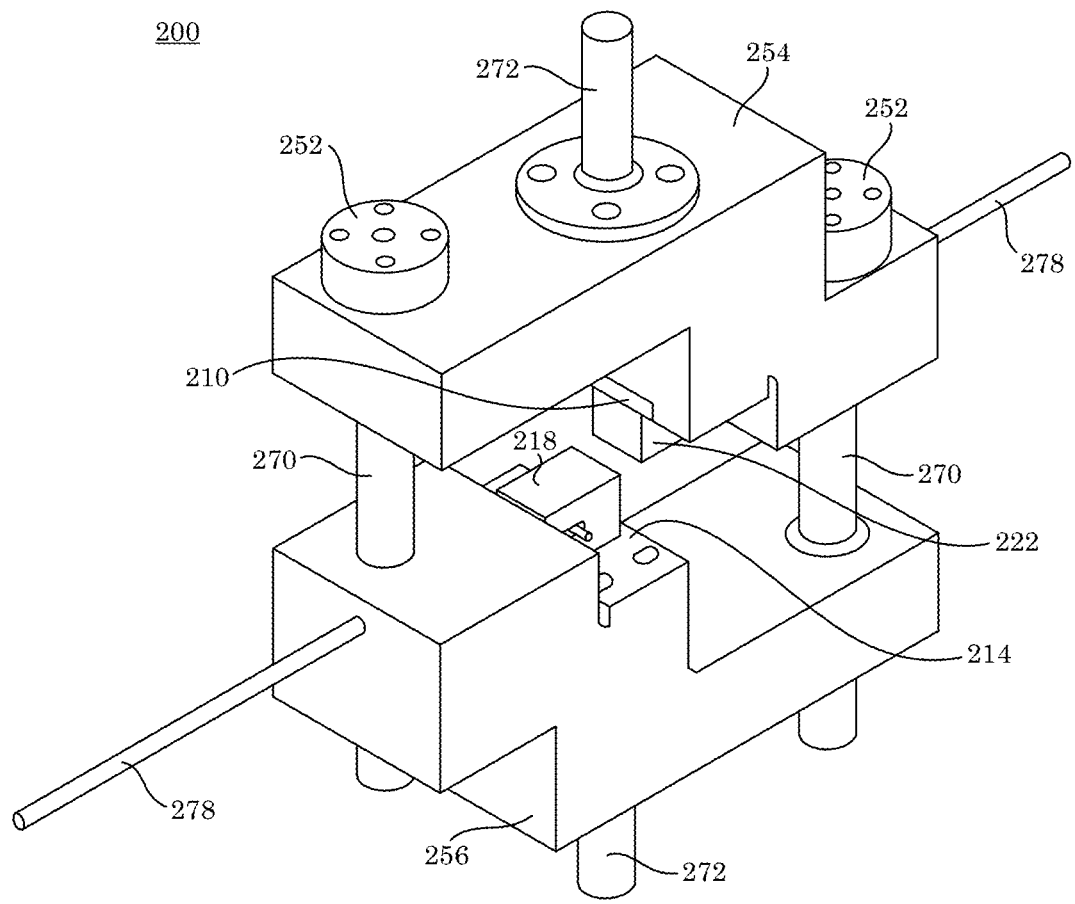
FIG. 2 shows a perspective view of a shear loader.
Figure 2:
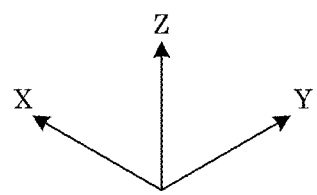
Figure 3:
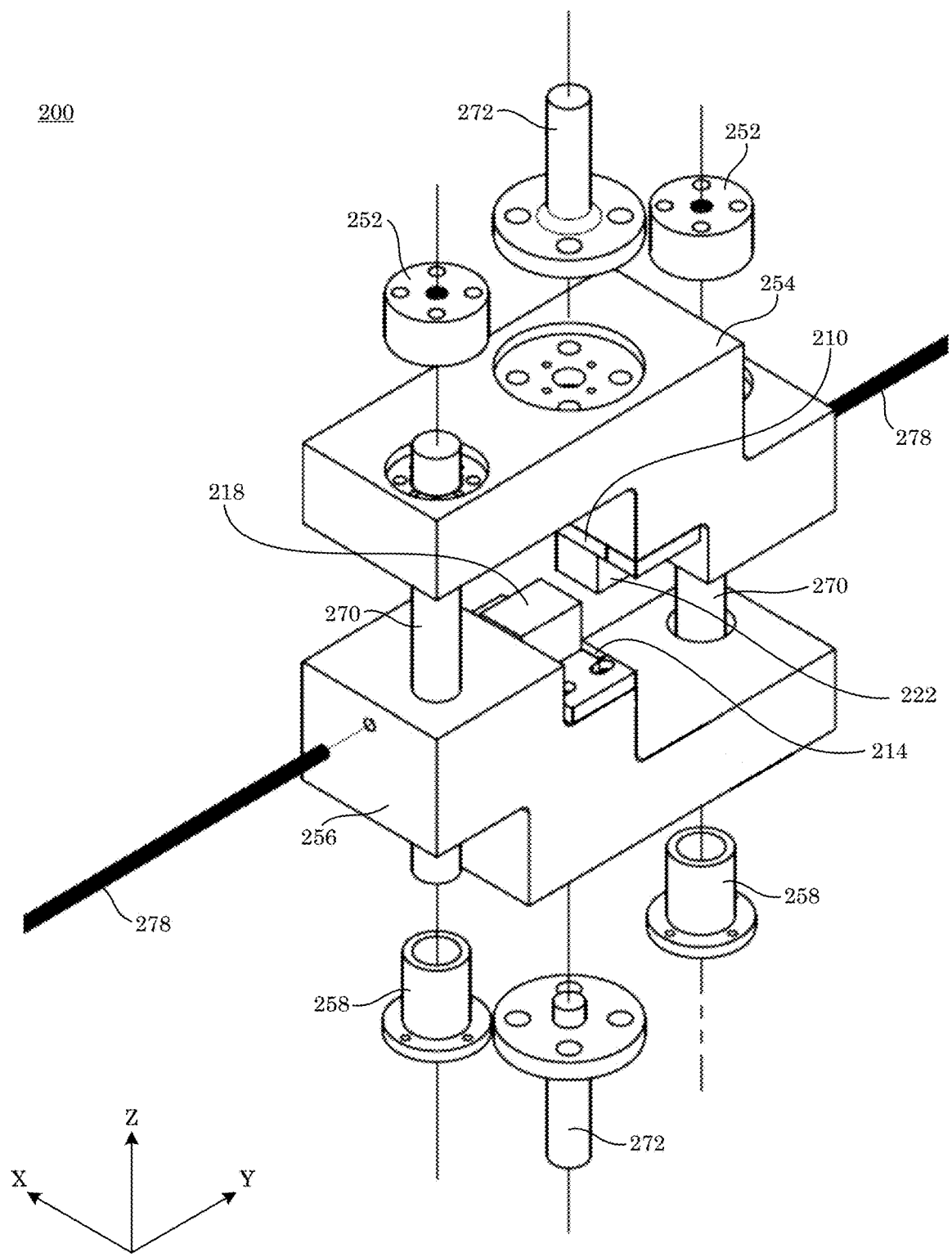
FIG. 3 shows an exploded view of the shear loader shown in FIG. 2.
Figure 4:
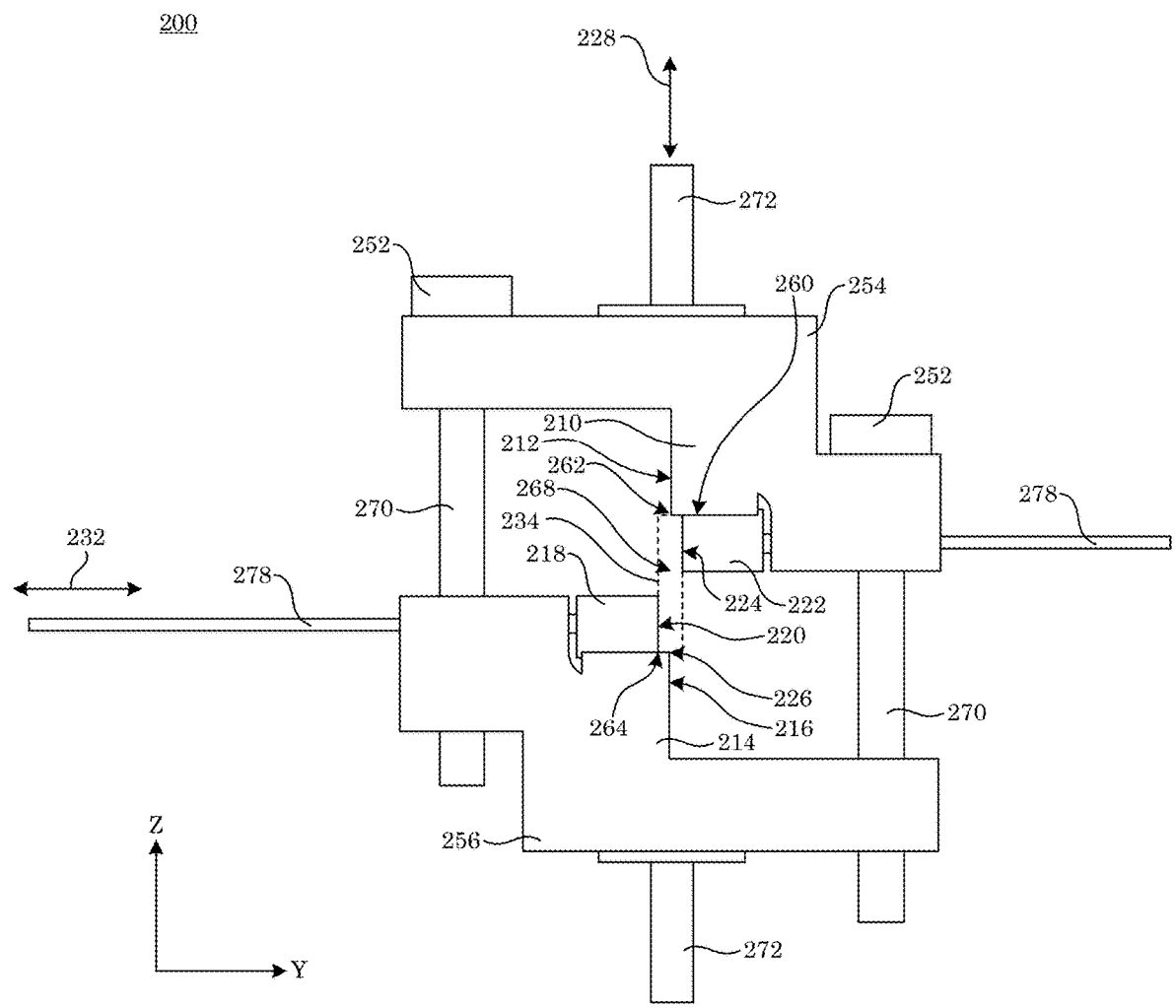
FIG. 4 shows a side view of the shear loader shown in FIG. 2.

Shear loader 200 produces a shear load on a sample. In an embodiment, with reference to FIG. 1, shear loader 200 includes first shearer 210. First shearer 210 provides shearing plane 226, first mating face 260 disposed orthogonal to first shearing face 212, and first knife edge 262 disposed along shearing plane 226 at an intersection of first shearing face 212 and first mating face 260. Shear loader 200 also includes second shearer 214. Second shearer 214 includes second shearing face 216 disposed along shearing plane 226, second mating face 264 disposed orthogonal to second shearing face 216, and second knife edge 266 disposed along shearing plane 226 at an intersection of second shearing face 216 and second mating face 264. Here, first shearer 210 and second shearer 214 have a relative motion in shear direction 228 that is parallel to shearing plane 226 and that provides the shear load to sample 234 along shearing plane 226. First load cell 222 is disposed on first mating face 260 of first shearer 210 and includes first load face 224 to contact sample 234. Second load cell 218 is disposed on second mating face 264 of second shearer 214 and includes second load face 220 opposingly disposed to first load face 224 of first load cell 222. It is contemplated that first load cell 222 and second load cell 218 have relative motion in load direction 232, wherein load direction 232 is orthogonal to shearing plane 226 and orthogonal to shear direction 228. In this manner, relative motion of first load cell 222 and second load cell 218 along load direction 232 subjects sample 234 to a side load along load direction 232. Shear loader 200 further includes sample region 268 that receives sample 234 and that is bounded by first mating face 260, second mating face 264, first load face 224, and second load face 220.

In an embodiment, with reference to FIG. 2, FIG. 3, FIG. 4, and FIG. 5, shear loader 200 includes self-alignment jigger 270 disposed on first shearer 210 and in mechanical communication with second shearer 214. Self-alignment jigger 270 provides linear motion between first shearer 210 and second shearer 214. Here, self-alignment jigger 270 can be disposed in a through hole in first body 254 on which is disposed first shearer 210 and first load cell 222. Self-alignment jigger 270 can be affixed to first body 254 with first body 254 so that self-alignment jigger 270 moves with first body 254 but is slidingly disposed in a through hole in second body 256 through bushing 258. Second load cell 218 and second shearer 214 are disposed on second body 256 so that second load cell 218 and second shearer 214 move with second body 256. A plurality of self-alignment jiggers 270 can be so disposed. In an embodiment, a pair of self-alignment jiggers 270 included in shear loader 200 linearly constrains motion of second body 256 relative to first body 254.

Fixture coupler 272 can be disposed on first body 254 to provide coupling of shear loader 200 to test machine 276. Fixture coupler 272 and first body 254 can be a monolithic structure, wherein they are made of a single piece of material, or fixture coupler 272 and first body 254 can be separate items that are fastened together, e.g., by a fastener such as a bolt, an adhesive, and the like. A second fixture coupler 272 can be disposed on second body 256. In this manner, first fixture coupler 272 disposed on first body 254 and second fixture coupler 272 disposed on second body 256 can mechanically engage and be held by test machine 276. In this manner, relative motion of first shearer 210 on first body 254 and second shearer 214 on second body 256 can be supplied by test machine 276, e.g., shown in FIG. 8.

Figure 5:
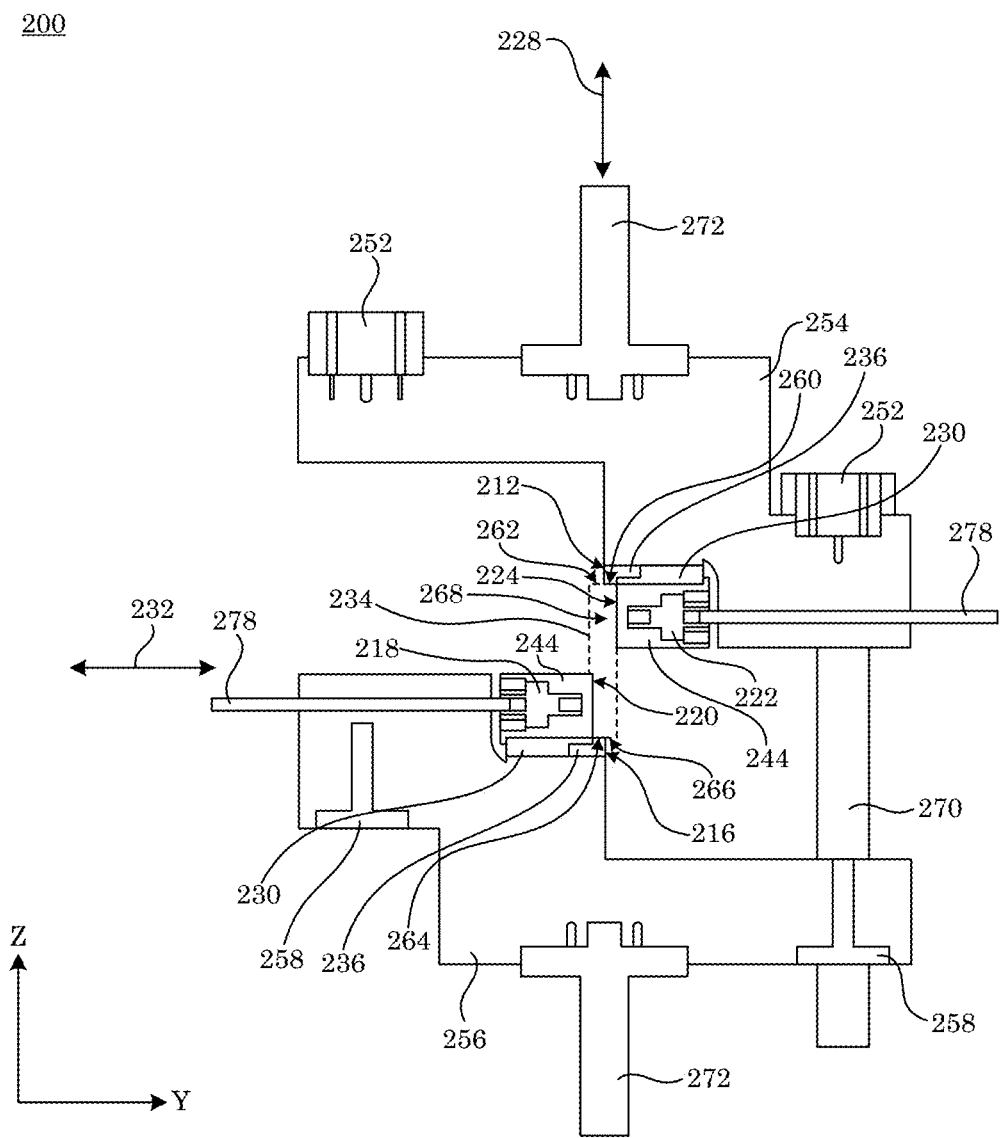
FIG. 5 shows a cross-section of the shear loader shown in FIG. 2.

With reference to FIG. 5, side adjuster 278 is disposed on first body 254, wherein side adjuster 278 can be received by a through hole in first body 254 so that slide adjuster 278 can engage sample alignment member 244 that is movably disposed on shear plate 230 so that the adjustment of side adjuster 278 adjusts a position of sample 234 via movement of sample alignment member 244 on shear plate 230. Slide adjuster 278 can have machine threads that engage mating threads on the receiving hole in first body 254. Similarly, second slide adjuster 278 can be disposed on second body 256, wherein second side adjuster 278 can be received by a through hole in second body 256 so that slide adjuster 278 can engage sample alignment member 244 that is movably disposed on shear plate 230 so that the adjustment of side adjuster 278 adjusts a position of sample 234 via movement of sample alignment member 244 on shear plate 230. Slide adjuster 278 can have machine threads that engage mating threads on the receiving hole in second body 256. Accordingly, the pair of slide adjuster 278 can be arranged to oppose one another respectively on first body 254 and second body 256 to adjust a position of sample 234 in sample region 268 so that a selected portion of sample 234 can be mechanically engaged by first knife edge 262 of first shearer 210 and second knife edge 266 of second shearer 214.

It should be appreciated that first body 254 and second body 256 have relative motion that is linearly constrained in shear direction 228 by self-alignment jiggers 270. As used here in, linearly constrained in shear direction 228 refers to geometrical motion in space rather than a rate of travel in time of first body 254 and second body 256. A relative velocity of first body 254 and second body 256 can be selected such that the relative velocity is linear, i.e., constant, or nonlinear. In an environment the relative velocity is constant. According to an embodiment, the relative velocity changes.

Figure 6:
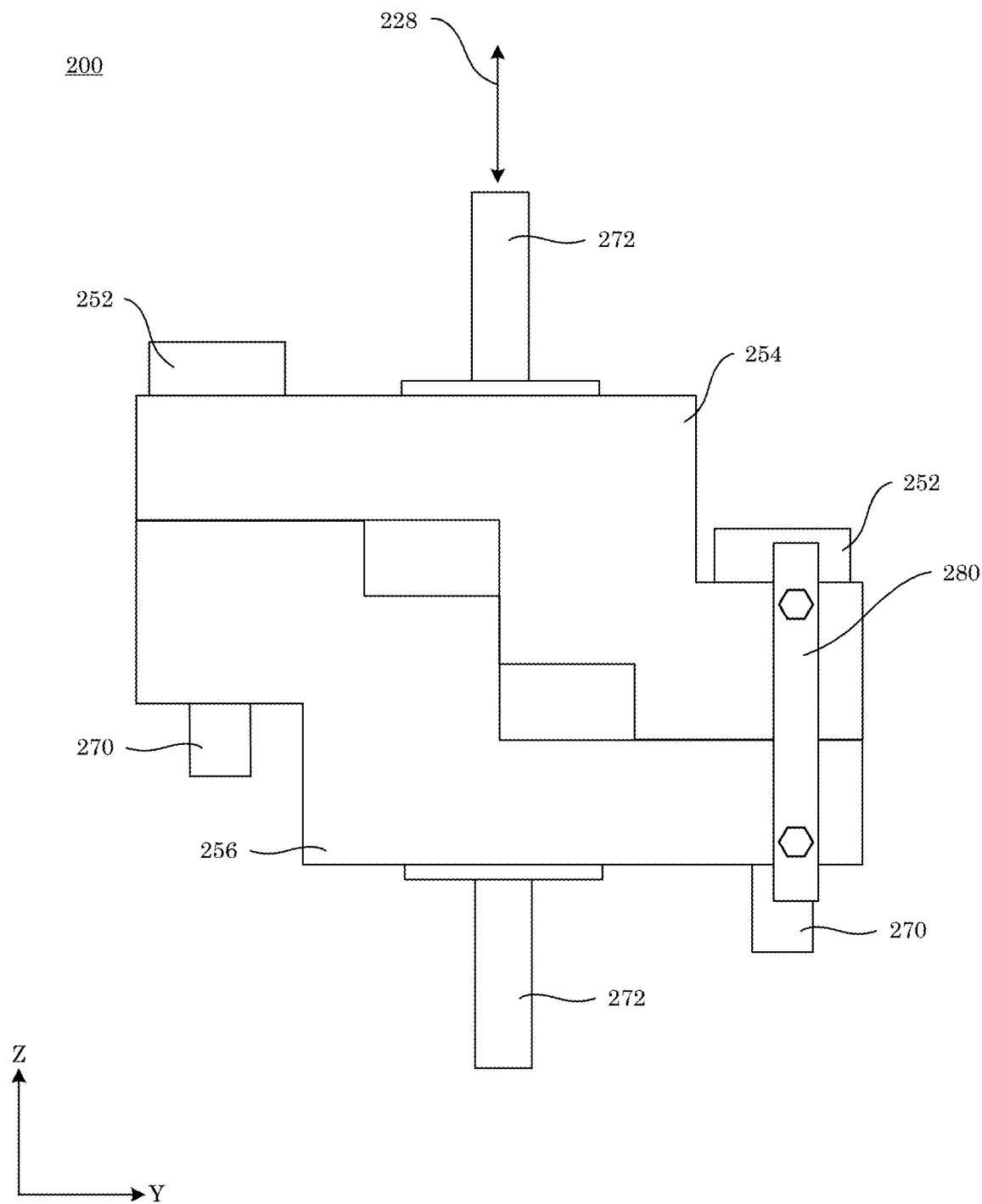
FIG. 6 shows a shear loader in which a first body and a second body contact in a fully closed position of the shear loader.

In an embodiment, with reference to FIG. 6, shear loader 200 can include lockout 280 fixedly disposed on first body 254 and fixedly disposed on second body 256 so that relative motion of first body 254 and second by 256 is constrained with the constant distance of separation of first body 254 and second body 256. Lockout 280 can be fastened to first body 254 with a fastener such as a bolt, and lockout 280 can be fastened to second body 256 with a fastener such as a bolt.

Figure 7:
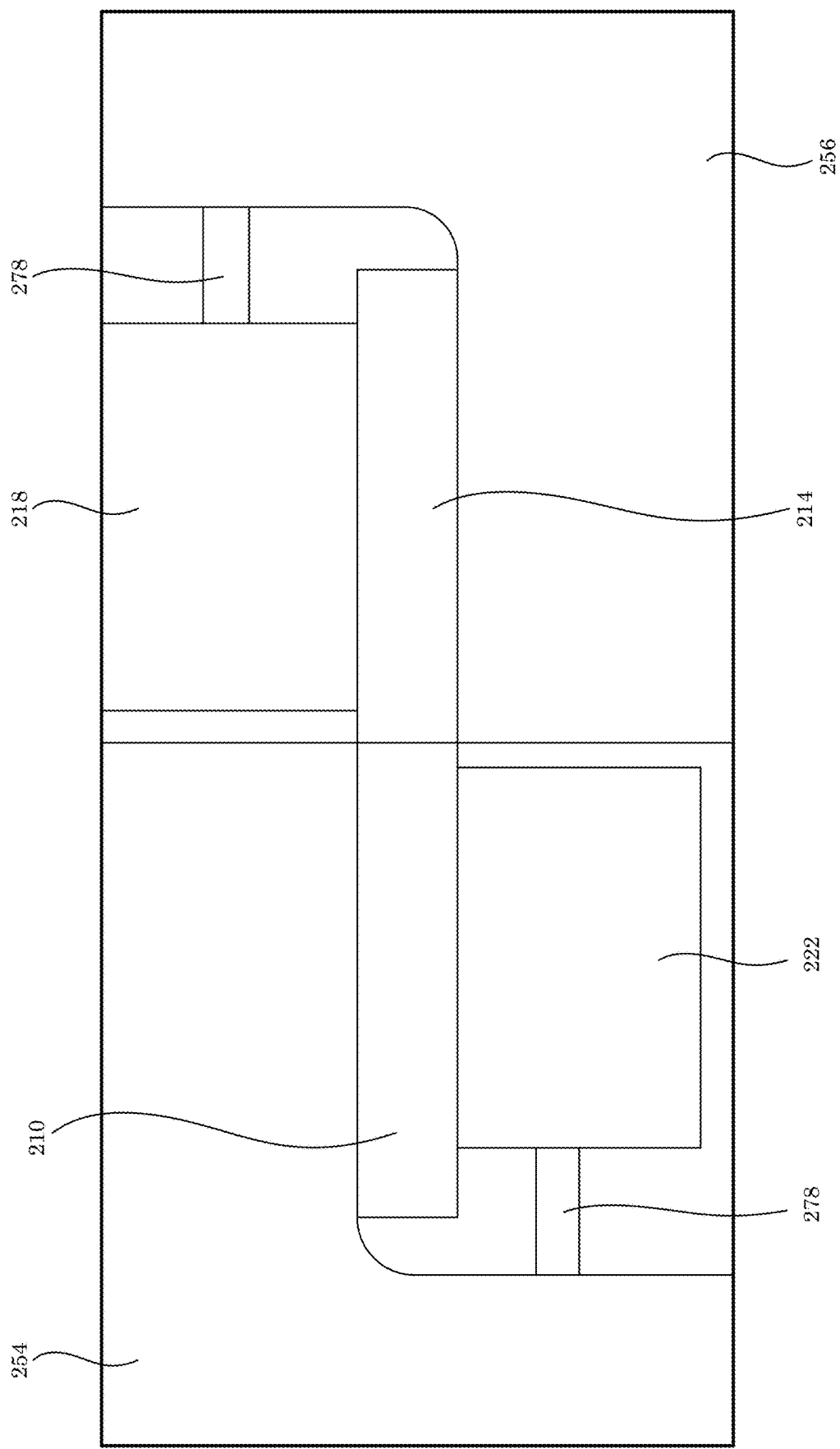
FIG. 7 shows a zoomed view of a sample region of a shear loader in an absence of a sample and in a fully closed position of the shear loader.

Since a distance of separation between the first body 254 and second body 256 can be selectively adjusted, a selected shear load can be subjected to sample 234. With reference to FIG. 7, which shows a zoomed view of sample region 268 in an absence of sample 234 but with the first shearer 210 and first load cell 222 disposed on first body 254 and second shearer 214 and second load cell 218 disposed on second body 256, first body 254 and second body 256 can be brought into direct contact, e.g., for storage, removal of shear loader 200 on test machine 276, installation of shear loader 200 on test machine 276, or transport of shear loader 200.

Figure 8:
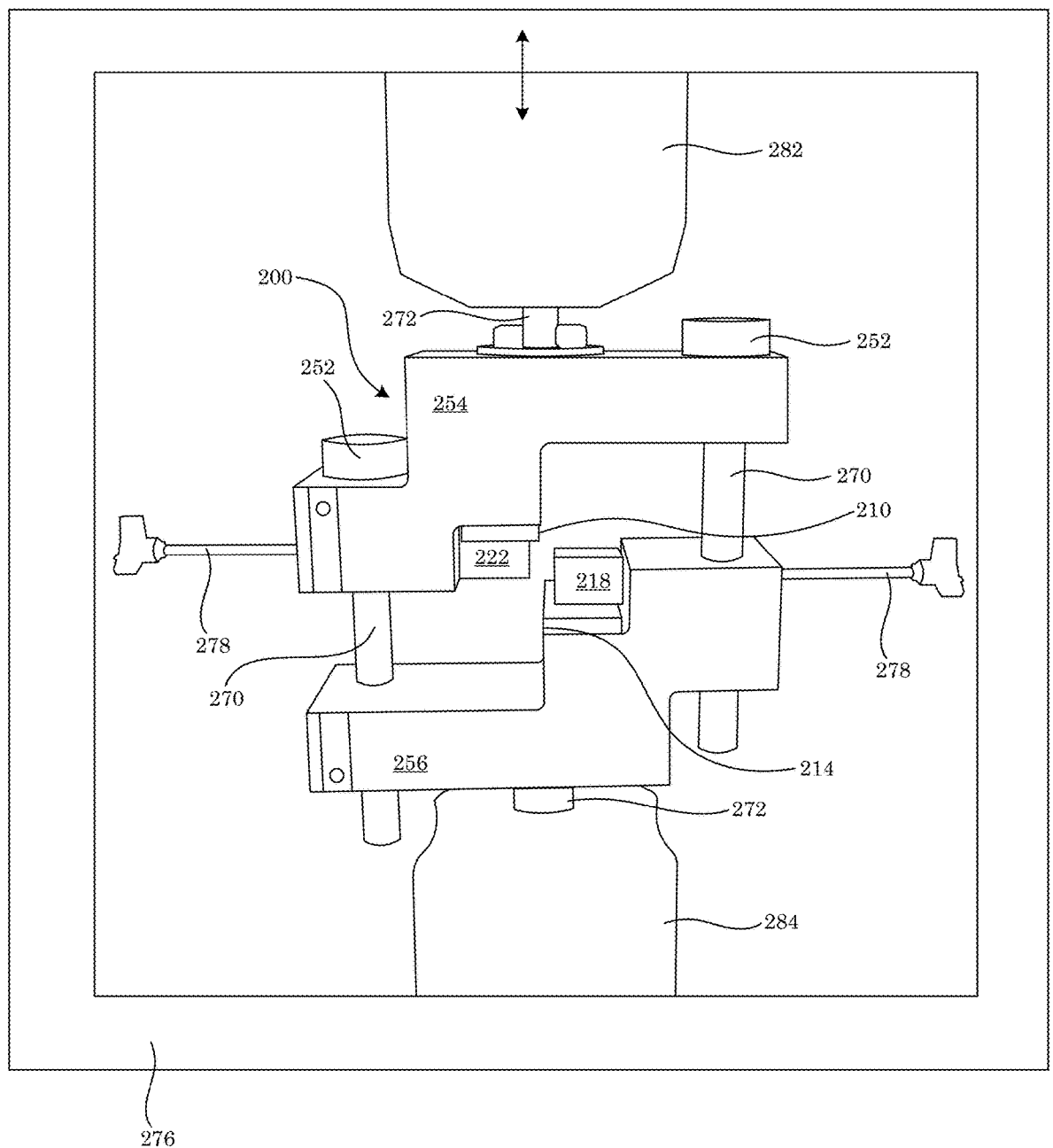
FIG. 8 shows a shear loader disposed on a test machine and in mechanical communication with a ram and platen of the test machine.

In an embodiment, as shown in FIG. 8 for a zoomed in portion of sample region 268, shear loader 200 is disposable on test machine 276. Here, fixture coupler 272 attached to first body 254 can be received by ram 282 that includes a grabber that, e.g., frictionally engages fixture coupler 272 so that shear loader 200 is securely attached to a test machine 276 via ram 282 and first body 254. Similarly, fixture coupler 272 attached to second body 256 can be received by platen 284 that includes a grabber that, e.g., frictionally engages fixture coupler 272 so that shear loader 200 is securely attached to a test machine 276 via platen 284 and second body 256.

Figure 9:
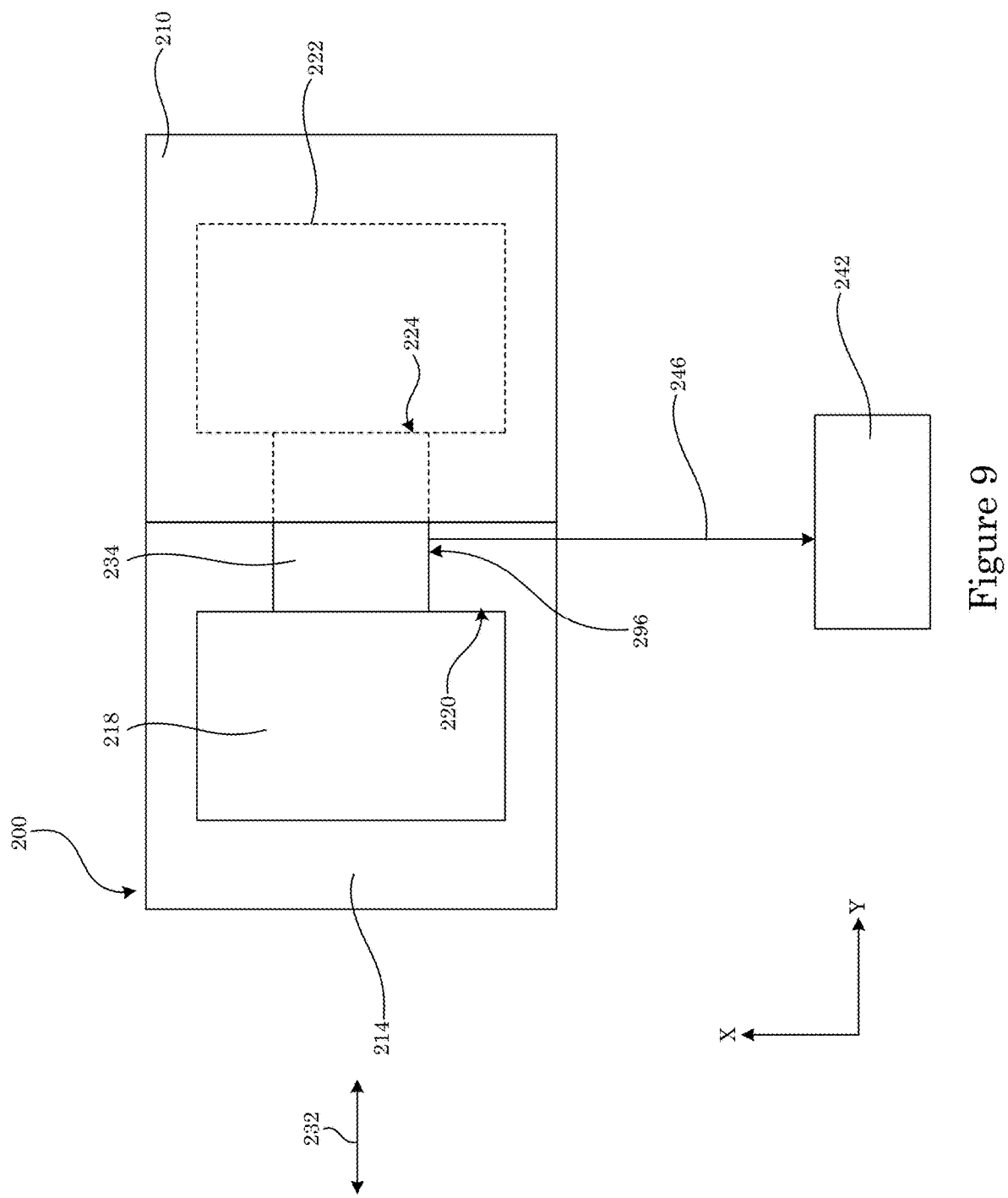
FIG. 9 shows a top view of a shear loader in which a sample is disposed in a sample region of the shear loader.
Figure 10:
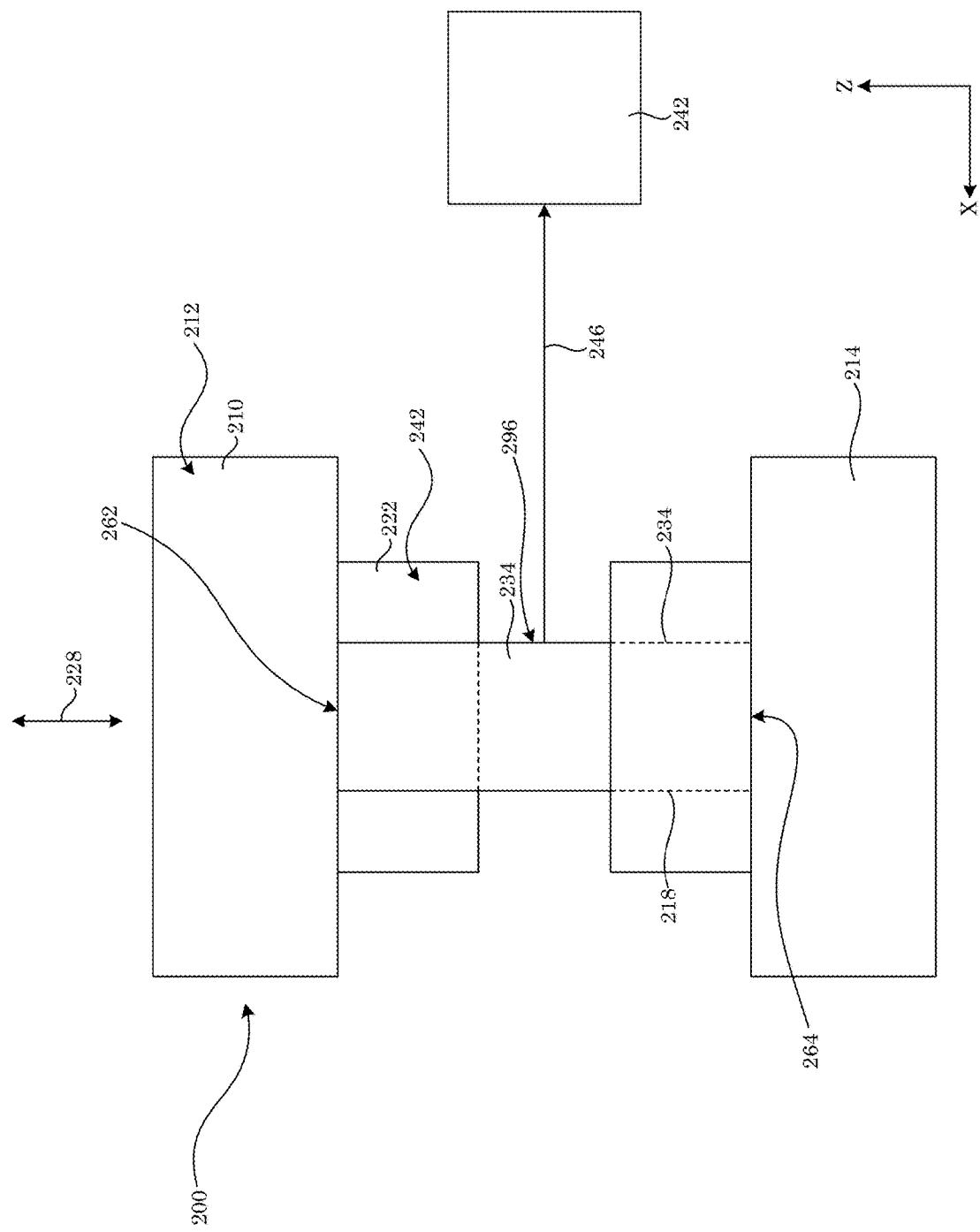
FIG. 10 shows a side view of the shear loader shown in FIG. 9.

In an embodiment, with reference to FIG. 9 and FIG. 10, sample 234 is disposed in the sample region 268 of shear loader 200 such that viewing face 296 of sample 234 is in optical communication by digital image correlator 242 such that digital image correlator 242 receives reflected light 246 reflected from viewing face 296. In this manner, digital image correlator 242 can determine 2D and 3D (stereo) deformation or strain, e.g., from shear load from first shearer 210 and second shearer 214, on sample 234 based on reflected light 246.

Figure 11:
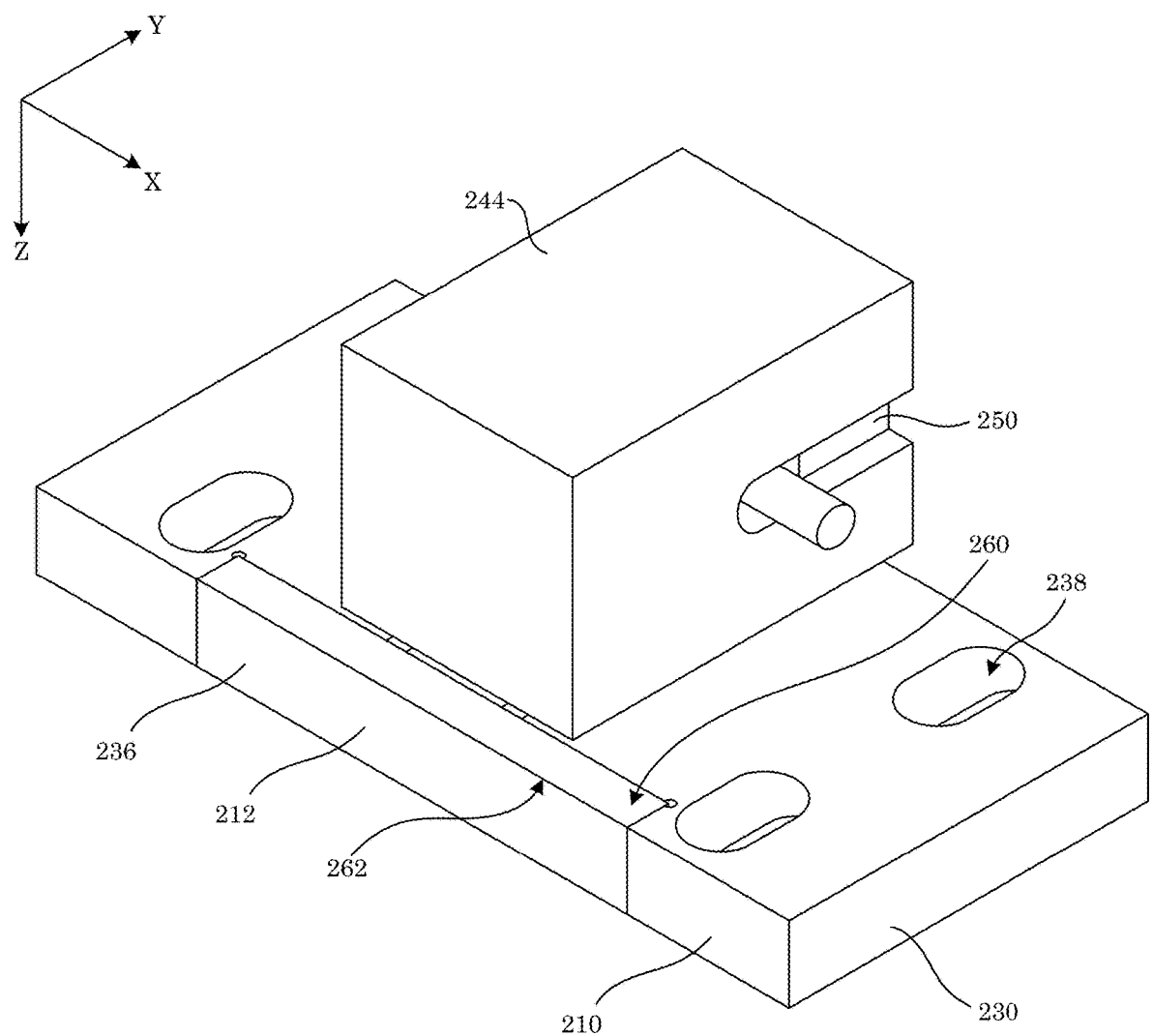
FIG. 11 shows a sample alignment member and load cell disposed on a shear plate of a shearer.
Figure 12:
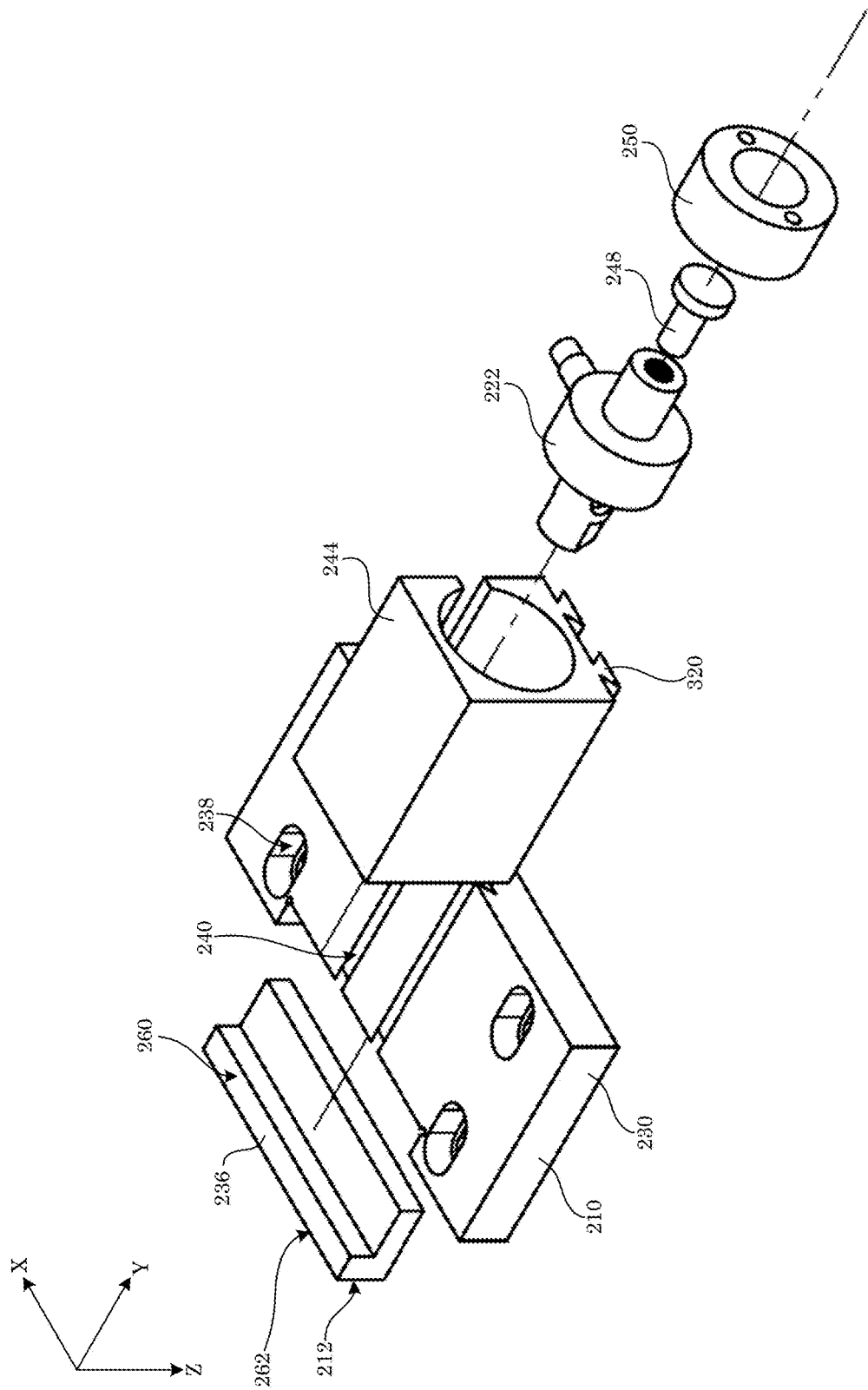
FIG. 12 shows an exploded view of the shear loader shown in FIG. 11.

In an embodiment, as shown in FIG. 11 and FIG. 12, with regard to receiving and positioning sample 234 in sample region 268 of shear loader 200, shear plate 230 can be disposed, e.g., first body 254 or second body 256, wherein shear plate 230 can include mount hole 238 through which a fastener, e.g., a bolt, can be used to fasten first shearer 210 to first body 254, or similarly fastened to second body 256 to attach second shearer 214 thereto. In this arrangement, insert 236 is disposed on shear plate 230 to so that first shearing face 212, first mating face 260, and first knife edge 262 are present and exposed to sample region 268. It is contemplated that shear plate 230 can be removably or permanently disposed on first body 254 or second body. Further, insert 236 can be removably or permanently disposed on shear plate 230. Moreover, first load cell 222 or second load cell 218 can be disposed in sample alignment member 244 that is disposed on shear plate 230. Dove tail groove 240 disposed in shear plate 230 receives dove tail 320 of sample alignment member 244 and provides selectively adjustable motion of sample alignment member 244 relative to insert 236 on shear plate 230 by which sample 234 can be positionally adjusted relative to first knife edge 262 of first shearer 210 and second knife edge 266 of second shearer 214. Sample alignment member 244 includes an internal hollow space that receives first load cell 222 or second load cell 218, which can be coupled to side adjuster 278 by compression adapter 248 and held by retaining bushing 250 in the hollow space.

Shear loader 200 subjects sample 234 to shear load, side load, or a combination thereof and in combination with digital image correlator 242 can determine a deformation or strain, up to failure of sample 234 responsive to the shear load, side load, or combination thereof. Components of shear loader independently can be made of a material, e.g., a metal, including an alloy, that provides a load force sufficient to cause sample 234 to shear while maintaining structural integrity and operational movement of elements of the shear loader 200.

Figure 13:
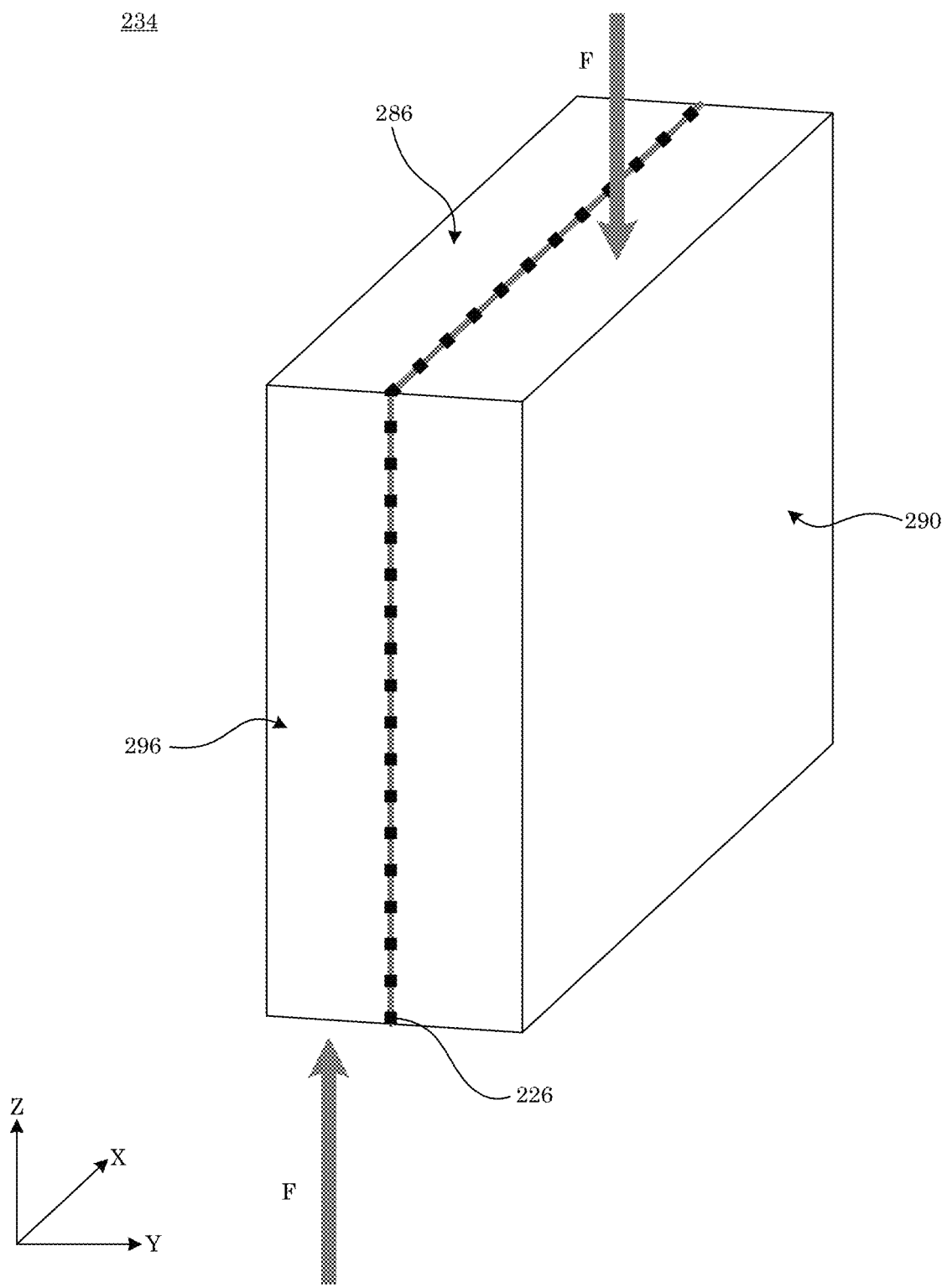
FIG. 13 shows a perspective view of a sample.
Figure 14:
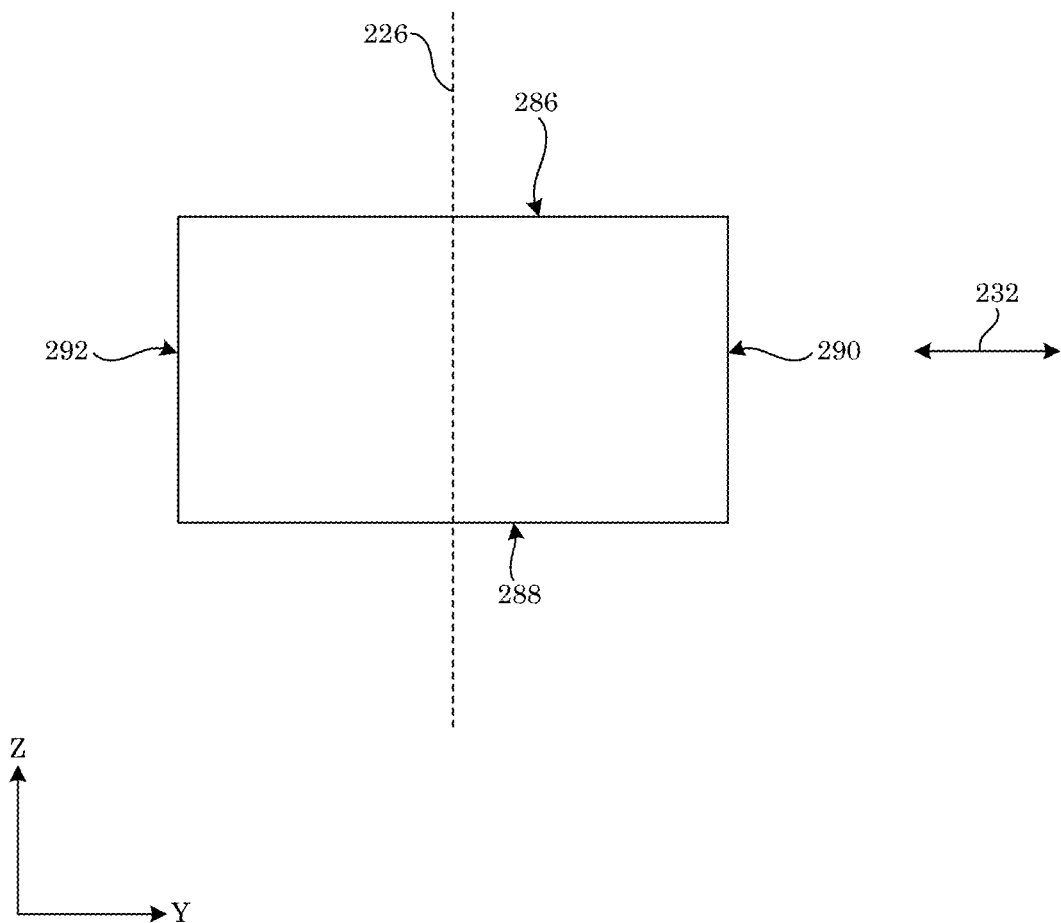
FIG. 14 shows side view of the sample shown in FIG. 13.
Figure 15:
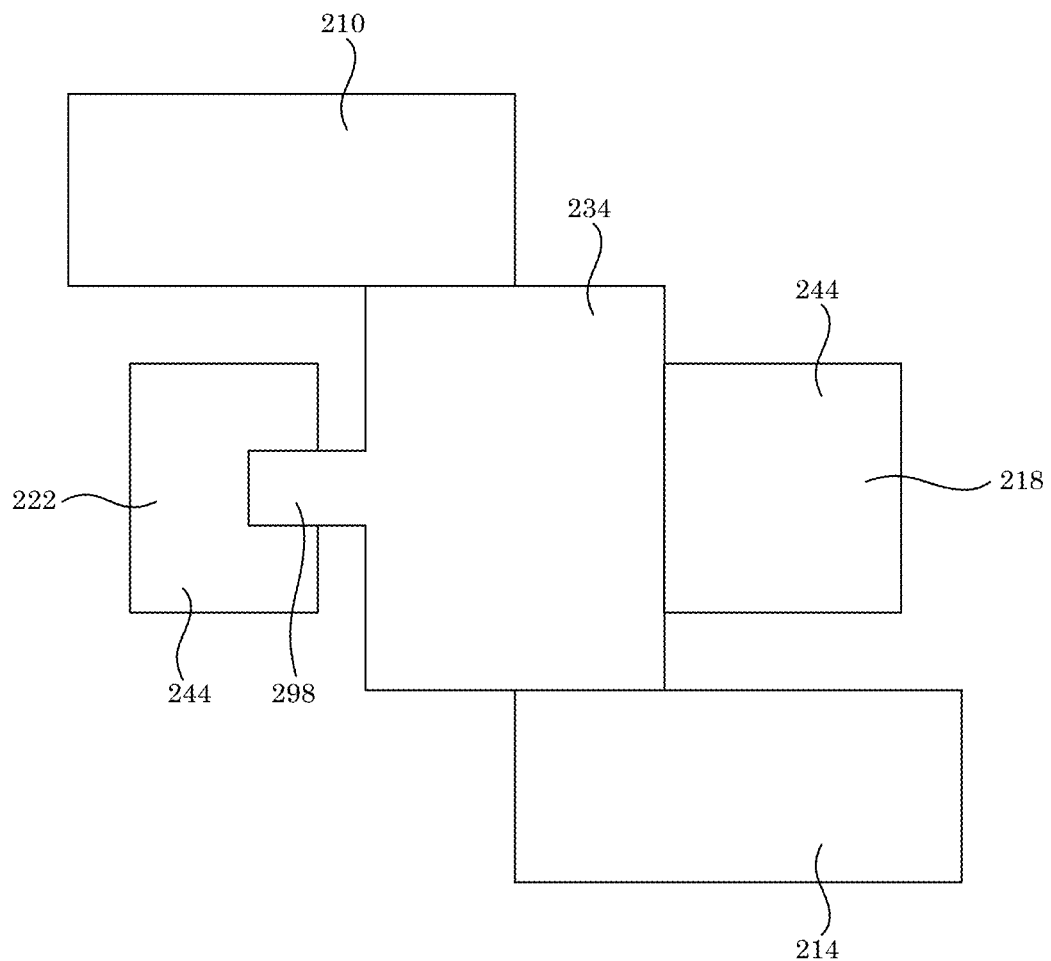
FIG. 15 shows a sample with stress tabs disposed on a shear loader.

Sample 234 can include a metal including an alloy, polymer, laminate composite (e.g., a fiber reinforced or hybrid composite), a glued adhesive joint, spot weld, and the like. A size of sample 234 can include a selected thickness, and shear loader 200 can be made to receive and shear any size sample, including samples that have a size (e.g., along load direction 232 or shear direction 228) that from a millimeter to several meters. With reference to FIG. 13, FIG. 14, and FIG. 15, sample 234 includes shear face 286 that engages first mating face 260 and first knife edge 262 of first shearer 210, second shear face 288 that engages second mating face 264 and second knife edge 266 of second shearer 214, load face 290 that engages first load face 224 of first load cell 222, load face 292 that engages second load face 220 of second load cell 218, and viewing face 296 that is in optical communication with digital image correlator 242. It should be appreciated that due to shear load exerted by first knife edge 262 and second knife edge 266, shearing plane 226 can be selectively arranged to coincide with a selected location of sample 234 through adjustment of position of sample 234 along adjustment direction 232 relative to first shearer 210 and second shearer 214. Further, sample 234 can include stress tab 298 that can be fixed to sample alignment member 244 that contains first load cell 222 or first load face 224 as shown in FIG. 15. In an embodiment, first knife edge 262 and second knife edge 266 are independently adjustable to be in a plane different than shearing plane 226 for adhesive testing in an absence of peeling. For shear testing, exemplary test machines 276 include universal test machines such as a universal tensile testing machine.

Shear loader 200 can be made in various ways. In an embodiment, a process for making shear loader 200 includes disposing insert 236 on shear plate 230; disposing sample alignment member 244 on shear plate 230; disposing first load cell 222 in sample alignment member 244; contacting first load cell 222 with compression adapter 248; inserting retaining bushing 250 in sample alignment member 244 to be in contact with first load cell 222; fastening shear plate 230 on first body 254; disposing second insert 236 on second shear plate 230; disposing second sample alignment member 244 on second shear plate 230; disposing second load cell 218 in second sample alignment member 244; contacting second load cell 218 with second compression adapter 248; inserting a second retaining bushing 250 in second sample alignment member 244 to be in contact with second load cell 218; fastening second shear plate 230 on second body 256; disposing first self-alignment jigger 270 through first body 254 and second body 256; fixing first self-alignment jigger 270 to first body 254 with first jigger flange 252; disposing second self-alignment jigger 270 through first body 254 and second body 256; fixing second self-alignment jigger 270 to first body 254 with second jigger flange 252; fixing first fixture coupler 272 to first body 254; fixing second fixture coupler 272 to second body 256; inserting first side adjuster 278 into first body 254; contacting first load cell 222 or with first side adjuster 278; and inserting a second side adjuster 278 into second body 256; contacting second load cell 218 with second side adjuster 278.

In the process for making shear loader 200, disposing sample alignment member 244 on shear plate 230 can include interference fitting of insert 236 on shear plate 230 by mechanical or thermal process. Disposing first load cell 222 in sample alignment member 244 can include mechanically assembling by sliding a fitment between first load cell 222 and alignment member 244 and maintaining alignment of first load cell 222 so that a wire harness of such elements is not damaged. In the process for making shear loader 200, contacting first load cell 222 with compression adapter 248 can include fastening of threading compression adaptor 248 into first load cell 222. Inserting retaining bushing 250 in sample alignment member 244 to be in contact with first load cell 222 can include mechanical fastening by threading retaining bushing 250 into sample alignment member 244. Fastening shear plate 230 on first body 254 can include using threaded socket head cap screws through mount hole 238 into first body 254.

In the process for making shear loader 200, disposing second insert 236 on second shear plate 230 can include interference fitting of second insert 236 on second shear plate 230 by mechanical or thermal process. Disposing second sample alignment member 244 on second shear plate 230 can include assembly of precision mechanical sliding fitment of second alignment member 244 on second shear plate 230. Disposing second load cell 218 in second sample alignment member 244 can include assembly by mechanical means of a sliding fitment between second load cell 218 and second alignment member 244 maintaining alignment of first load cell 222 wire harness with a slot in second sample alignment member 244. In the process for making shear loader 200, contacting second load cell 218 with second compression adapter 248 can include threading second compression adapter 248 into second load cell 218. Inserting a second retaining bushing 250 in second sample alignment member 244 to be in contact with second load cell 218 can include mechanical fastening by threading second retaining bushing 250 into second sample alignment member 244. In the process for making shear loader 200, fastening second shear plate 230 on second body 256 can include using threaded socket head cap screws through second mount hole 238.

In the process for making shear loader 200, disposing first self-alignment jigger 270 through first body 254 and second body 256 can include a precision sliding fitment between first alignment jigger 270 and first body 254 and locking first alignment jigger in place using a set screw. Fixing first self-alignment jigger 270 to first body 254 with first jigger flange 252 can include fitting of jigger flange onto jigger 270 and fastening jigger flange to body 254 by threaded fastener. In the process for making shear loader 200, disposing second self-alignment jigger 270 through first body 254 and second body 256 can include a precision sliding fitment between second alignment jigger 270 and first body 254 and locking second alignment jigger in place using a set screw. Fixing second self-alignment jigger 270 to first body 254 with second jigger flange 252 can include fitting of jigger flange 252 onto jigger 270 and fastening jigger flange to body 254 by threaded fastener. In the process for making shear loader 200, fixing first fixture coupler 272 to first body 254 can include alignment of fixture coupler 272 onto receiving bore in body 254 and securing with threaded fasteners.

In the process for making shear loader 200, fixing second fixture coupler 272 to second body 256 can include alignment of fixture coupler 272 onto receiving bore in body 256 and securing with threaded fasteners. Inserting first side adjuster 278 into first body 254 can include threading side adjuster 278 into body 256. Contacting first load cell 222 with first side adjuster 278 can include turning threaded side adjuster 278 until surface mates with compression adaptor 248. Inserting a second side adjuster 278 into second body 256 can include threading second side adjuster 278 into second body 256. In the process for making shear loader 200, contacting second load cell 218 with second side adjuster 278 can include turning second side adjuster 278 until surface mates with second compression adaptor 248. The process for making shear loader 200 further can include disposing of first and second bushing 258 onto body 256 by interference fitment using mechanical or thermal processes.

Making individual components of shear loader 200 can be accomplished by, e.g., subtractive manufacturing processes. Components can be joined together by mechanical fasteners, an interference fitment, and geometric constraints. Alignment of subcomponents of shear loader 200 can be controlled by engineered and manufacturing controls including locational interference and locational clearance fitments. The fitments of subcomponents can provide a small compliance shear loader. It is contemplated that embodiments include an x-wise configuration between jigger 270 on the left, load introduction via fixture coupler 272 and jigger 270 on the right that provide reduced system compliance.

Shear loader 200 has numerous advantageous and unexpected benefits and uses, including performing pure mode II shear loading and performing mixed mode I and mode II shear loading. In an embodiment, a process for performing pure mode II shear loading includes: receiving sample 234 in sample region 268 of shear loader 200; contacting second shear face 288 of sample 234 with second mating face 264 of second shearer 214; contacting first load face 290 of sample 234 with first load face 224 of first load cell 222; contacting second load face 292 of sample 234 with second load face 220 of second load cell 218; contacting first shear face 286 of sample 234 with first mating face 260 of first shearer 210; moving first shearer 210 relative to second shearer 214 in a linear direction along shear direction 228; and subjecting sample 234 to shear load provided by first knife edge 262 of first shearer 210 and second knife edge 266 of second shearer 214 in an absence of a mode I or mode III force to perform pure mode II shear loading. In an embodiment, the shear load subjected to sample 234 by first knife edge 262 of first shearer 210 and second knife edge 266 of second shearer 214 consists essentially of a static force. According to an embodiment, the shear load subjected to sample 234 by first knife edge 262 of first shearer 210 and second knife edge 266 of second shearer 214 includes a dynamic force. The process for performing pure mode II shear loading also can include disposing shear loader 200 on test machine 276. The process also can include receiving reflected light 246 from viewing face 296 of sample 234 with digital image correlator 242; and determining a strain on sample 234 from reflected light 246. The strain can be produced in response to subjecting sample 234 to the shear load. The process for performing pure mode II shear loading can include completely fracturing sample 234 in response to subjecting sample 234 to the shear load although it is contemplated that performing pure mode II shear loading can include partially fracturing sample 234 in response to subjecting sample 234 to the shear load.

In the process for performing pure mode II shear loading, receiving sample 234 in sample region 268 of shear loader 200 can include placing sample into shear loader 200. Contacting second shear face 288 of sample 234 with second mating face 264 of second shearer 214 can moving body 256 relative to body 254 using test machine 276. Contacting second load face 290 of sample 234 with second load face 220 of second load cell 218 can include turning second side adjuster 278. Contacting first load face 290 of sample 234 with first load face 224 of first load cell 222 can include turning first side adjuster 278 and applying a side preload. In the process for performing pure mode II shear loading, contacting first shear face 286 of sample 234 with first mating face 260 of first shearer 210 can include moving body 256 relative to body 254 using test machine 276. In the process for performing pure mode II shear loading, moving first shearer 210 relative to second shearer 214 in a linear direction along shear direction 228 can include moving body 256 relative to body 254 using test machine 276.

In the process for performing pure mode II shear loading, the shear load subjected to sample 234 by first knife edge 262 of first shearer 210 and second knife edge 266 of second shearer 214 consists essentially of a static force. According to an embodiment, the shear load subjected to sample 234 by first knife edge 262 of first shearer 210 and second knife edge 266 of second shearer 214 includes a dynamic force. The process for performing pure mode II shear loading also can include disposing shear loader 200 on test machine 276. The process also can include receiving reflected light 246 from viewing face 296 of sample 234 with digital image correlator 242 can include tracking of unique patterns disposed of on the specimen face using cameras, computer hardware, or software.

In the process for performing pure mode II shear loading, determining a deformation and calculating strain on sample 234 can be made from reflected light 246. Fracturing sample 234 in response to subjecting sample 234 to the shear load can include moving body 256 relative to body 254 using test machine 276 until complete failure occurs and optionally followed by a force drop.

In an embodiment, a process for performing mixed mode I and mode II shear loading includes: receiving sample 234 in sample region 268 of shear loader 200; contacting first shear face 286 of sample 234 with first mating face 260 of first shearer 210; contacting second shear face 288 of sample 234 with second mating face 264 of second shearer 214; contacting first load face 290 of sample 234 with first load face 224 of first load cell 222; contacting second load face 292 of sample 234 with second load face 220 of second load cell 218; moving first shearer 210 relative to second shearer 214 in a linear direction along shear direction 228; subjecting sample 234 to the shear load provided by first knife edge 262 of first shearer 210 and second knife edge 266 of second shearer 214; subjecting sample 234 to the side load provided by first load cell 222 to perform mixed mode I and mode II shear loading. The shear load subjected to sample 234 by first knife edge 262 of first shearer 210 and second knife edge 266 of second shearer 214 can consist essentially of a static force. In some embodiments, the shear load includes a dynamic force. In an embodiment, the process for performing mixed mode I and mode II shear loading also includes disposing shear loader 200 on test machine 276. In an embodiment, the process for performing mixed mode I and mode II shear loading also includes receiving reflected light 246 from viewing face 296 of sample 234 with digital image correlator 242; and determining a strain on sample 234 from reflected light 246. It is contemplated that the strain is produced in response to subjecting sample 234 to the shear load and side load. In an embodiment, the process for performing mixed mode I and mode II shear loading of claim 14 includes pulling on sample 234 via stress tab 298 disposed on sample 234. The process for performing mixed mode I and mode II shear loading can include completely fracturing sample 234 although it is contemplated that performing mixed mode I and mode II shear loading can include partially fracturing sample 234.

In the process for performing mixed mode I and mode II shear loading, the shear load subjected to sample 234 by first knife edge 262 of first shearer 210 and second knife edge 266 of second shearer 214 can consist essentially of a static force. In some embodiments, the shear load includes a dynamic force. In an embodiment, the process for performing mixed mode I and mode II shear loading also includes disposing shear loader 200 on test machine 276. In an embodiment, the process for performing mixed mode I and mode II shear loading also includes receiving reflected light 246 from viewing face 296 of sample 234 with digital image correlator 242.

Figure 16:
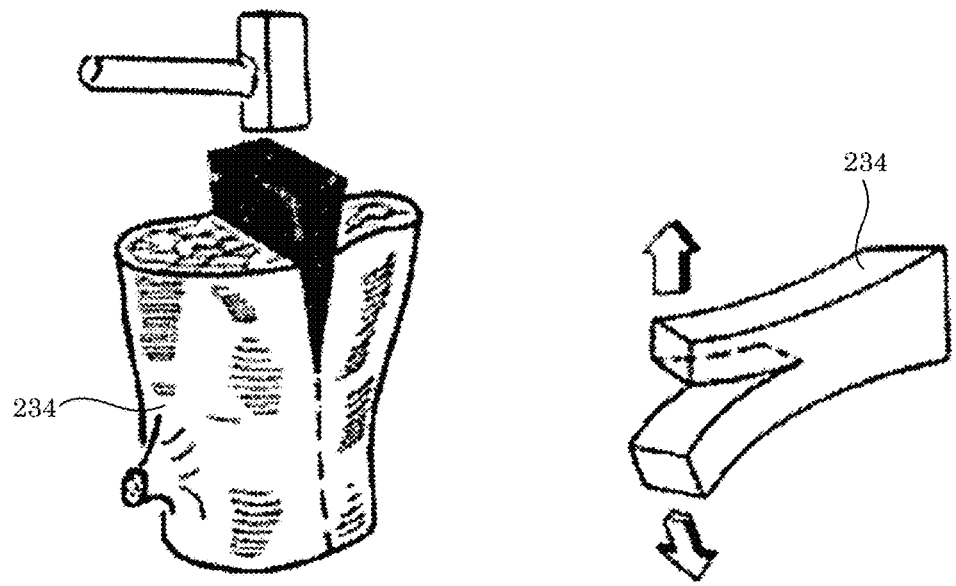
FIG. 16 shows a mode I shear in panel A, a mode II shear in panel B, and mode III shear in C.
Figure 16:
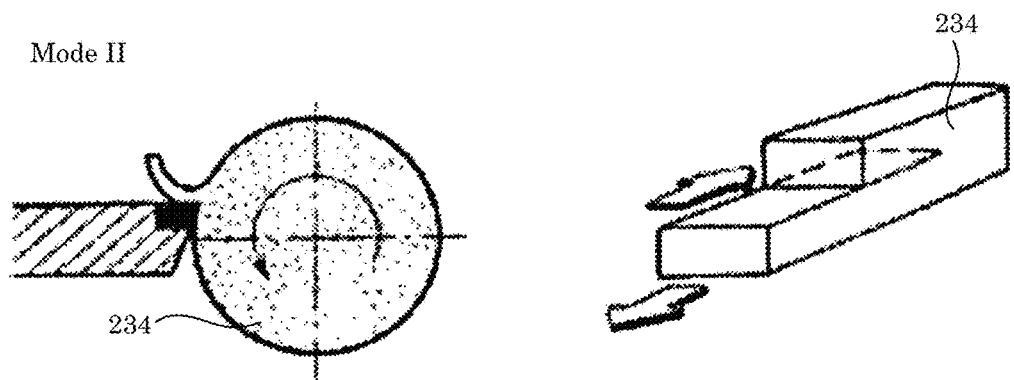
Figure 16:
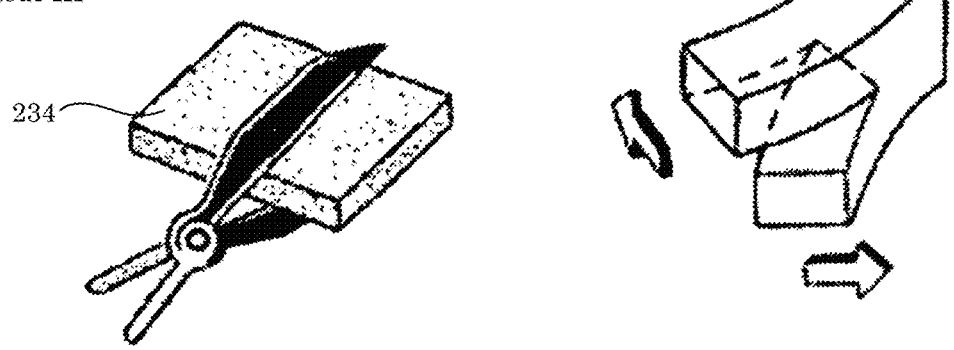

Shear loader 200 and processes disclosed herein have numerous beneficial uses and advantageous properties. In an aspect, shear loader 200 precisely shears a sample while recording exerted loads and deformations made to the sample in response to the loads. Shear loader 200 can be installed in a conventional servo hydraulic mechanical testing system. The sample can be disposed between the shearers after being marked, e.g., with a speckle pattern, for imaging by a digital image correlation (DIC) 2D and 3D deformation and strain mapping system. Shear loader shears the sample while loads and deformations are recorded. From this data, the pure shear strength, strain to failure, and shear modulus is determined, e.g., through calculation. Moreover, shear loader 200 can be used with a conventional test frame of sufficient capacity. Shear loader 200 has adjustors to locate the plane of shear within the thickness of the sample to test specific locations. Further., the sample can be loaded in Mode II or a mixed modes II/I to study more complex crack loadings. With reference to FIG. 16, as shown in panel A, mode I is an opening mode for a crack, wherein faces of the sample are pulled apart instead of sheared, and mode II and mode III respectively are shown in panel B and panel C.

Conventional testing for measurement of shear properties of materials are inconsistent and include assumptions that may involve forming a lap joint from a pair of strips of material and pulling in tension until sample failure. The shortcomings of conventional loading the sample include not placing the sample in pure shear but in a combination of tension and shear. As a result, conventional tests subject a sample to stress that is thus not uniquely attributable to a mode, and deformation within the sample may not be measured directly so the strain to failure is not accurately determined. Sear loader 200 overcomes this technical problems and shortcoming.

That is, shear loader 200 overcomes these problems with conventional technologies and testing by shear loader 200 subjecting sample 234 to pure shear by shearing sample 234 with first shearer 210 and second shearer 214. Loads are measured with hydraulic test frame instrumentation, and deformation and purity of straining state can be compared to intended conditions that are measured using digital image correlation strain mapping, e.g., with digital image correlator 242 so that the determination made by shear loader 200 is pure shear rather than a combination made by conventional systems. Additionally, modeling as disclosed herein receives inputs for data that comes from physical tests. Variables for shear behavior of materials and joints involves pure shear conditions, and shear loader 200 provides such data.

Shear loader 200 and processed herein unexpectedly provide digital image correlation for deformation and strain mapping for analysis of the deformation response (e.g., shear modulus for adhesively bonded joints) and strain response, e.g., shear modulus for laminate composites. DIC from a front or back side of a sample is provided by shear loader 200. Furthermore, shear loader 200 can be loaded from two sides (top or bottom). Advantageously, shear loader 200 tests adhesives and determines shear strength and shear modulus thereof. The modular setup of shear loader 200 provides testing of the interlaminar properties and cyclical testing.

The articles and processes herein are illustrated further by the following Example, which is non-limiting.

EXAMPLE

Figure 17:
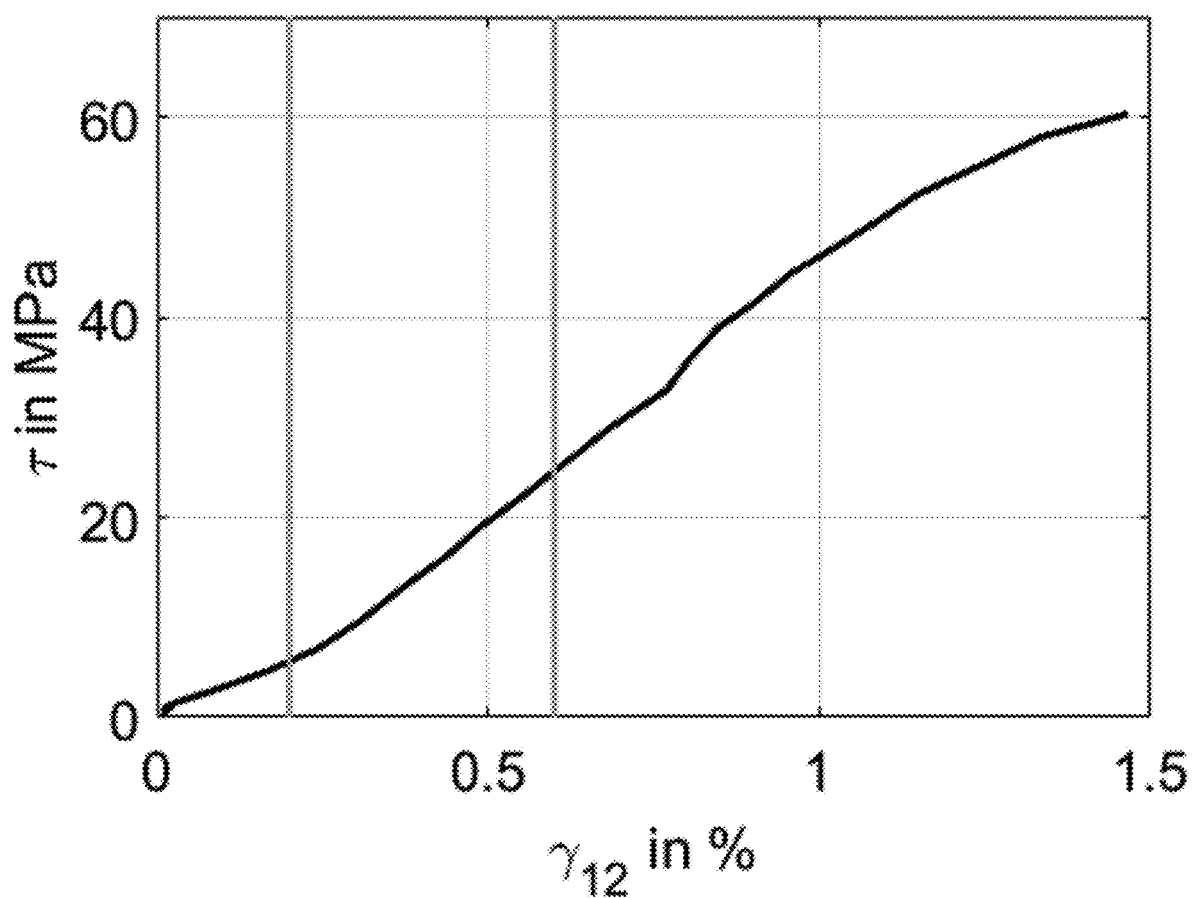
FIG. 17 shows a graph of shear stress vs. shear strain from principal strains) of a unidirectionally carbon fiber reinforced polymer composites (CFRP) with region for determination of shear modulus.
Figure 18:
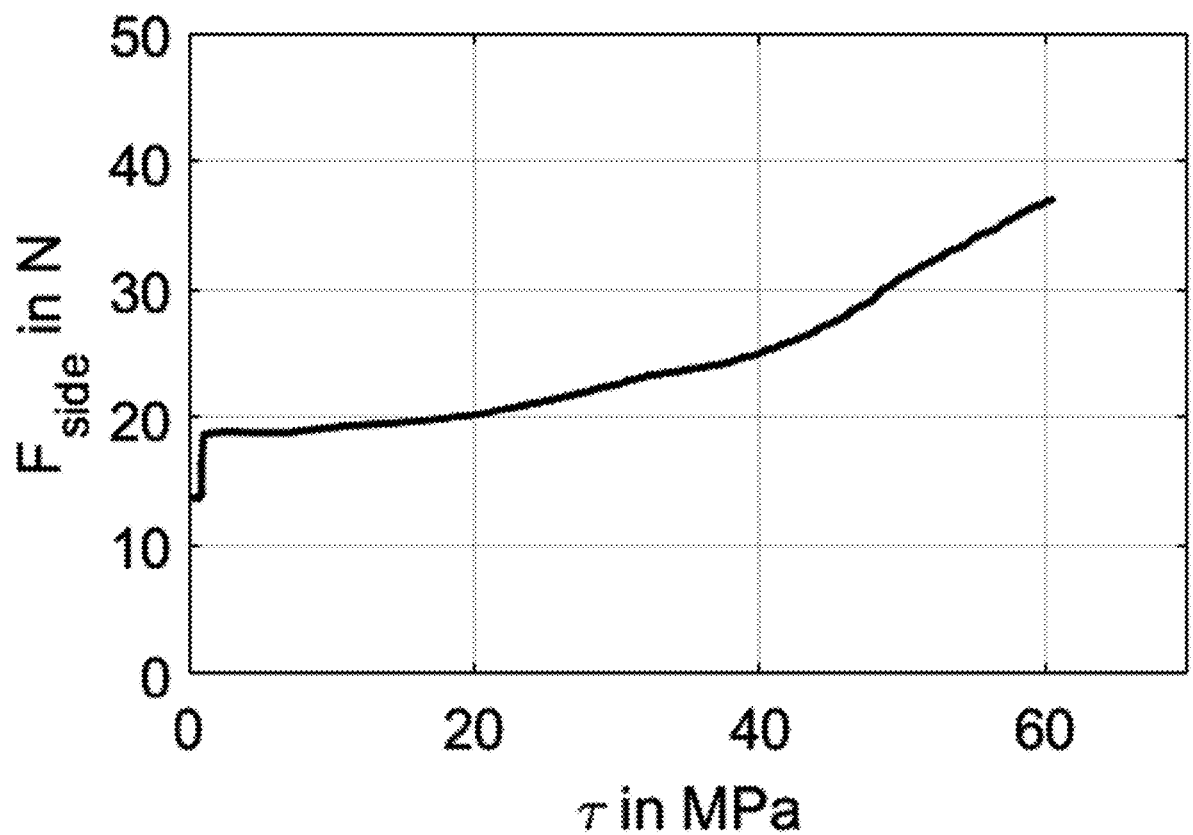
FIG. 18 shows a graph of side force from (first/second) load cell versus shear stress of a unidirectionally reinforced CFRP, wherein a side load for clamping was less than 20 N.

Exemplary data from with a shear loader is shown in FIGS. 17, 18, 19, 20, and 21. FIG. 17 shows a graph of shear stress versus shear strain from principal strains of a unidirectionally reinforced CFRP with region for determination of shear modulus. FIG. 18 shows a graph of side force from first or second load cell versus shear stress of a unidirectionally reinforced CFRP with a side load for clamping that was less than 20 N.

Figure 19:
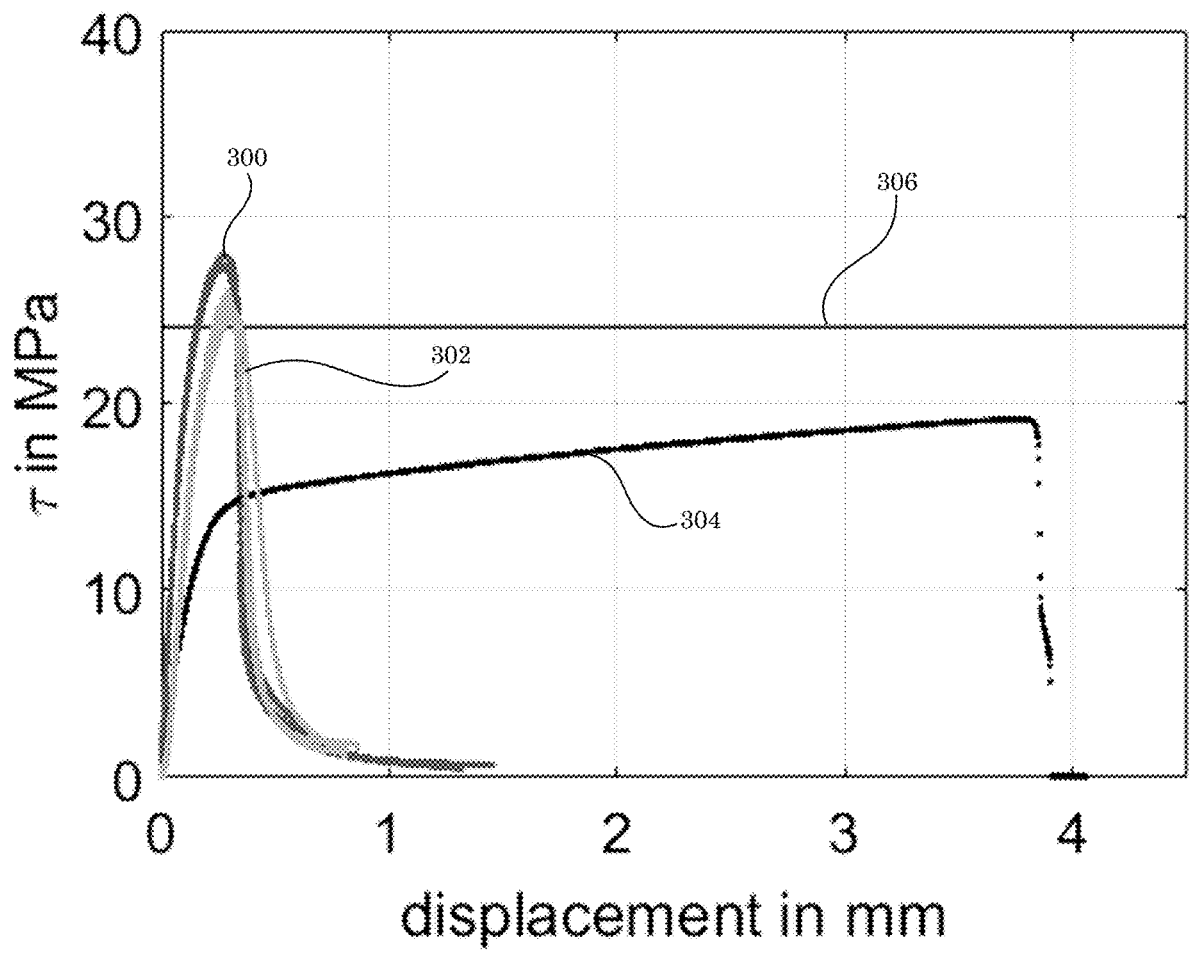
FIG. 19 shows a graph of a comparison of test results for determination of shear stress-actuator displacement curves of a specific adhesively bonded steel joint in which reference numerals are as follows: 306, acc. to adhesive data sheet; 304, tensile testing of single overlap specimen showing plastic deformation of adherent (invalid); 300, tensile testing of double-lap specimen (valid); and 302, shear loader experiments (valid, in direct comparison of 300)

FIG. 19 shows a graph of a comparison of different test results for determination of shear stress-actuator displacement curves of a specific adhesively bonded steel joint (306: acc. to adhesive data sheet, 304: tensile testing of single overlap specimen showing plastic deformation of adherent (invalid), 300: tensile testing of double-lap specimen (valid), 302: shear loader experiments (valid, in direct comparison of 300).

Figure 20:
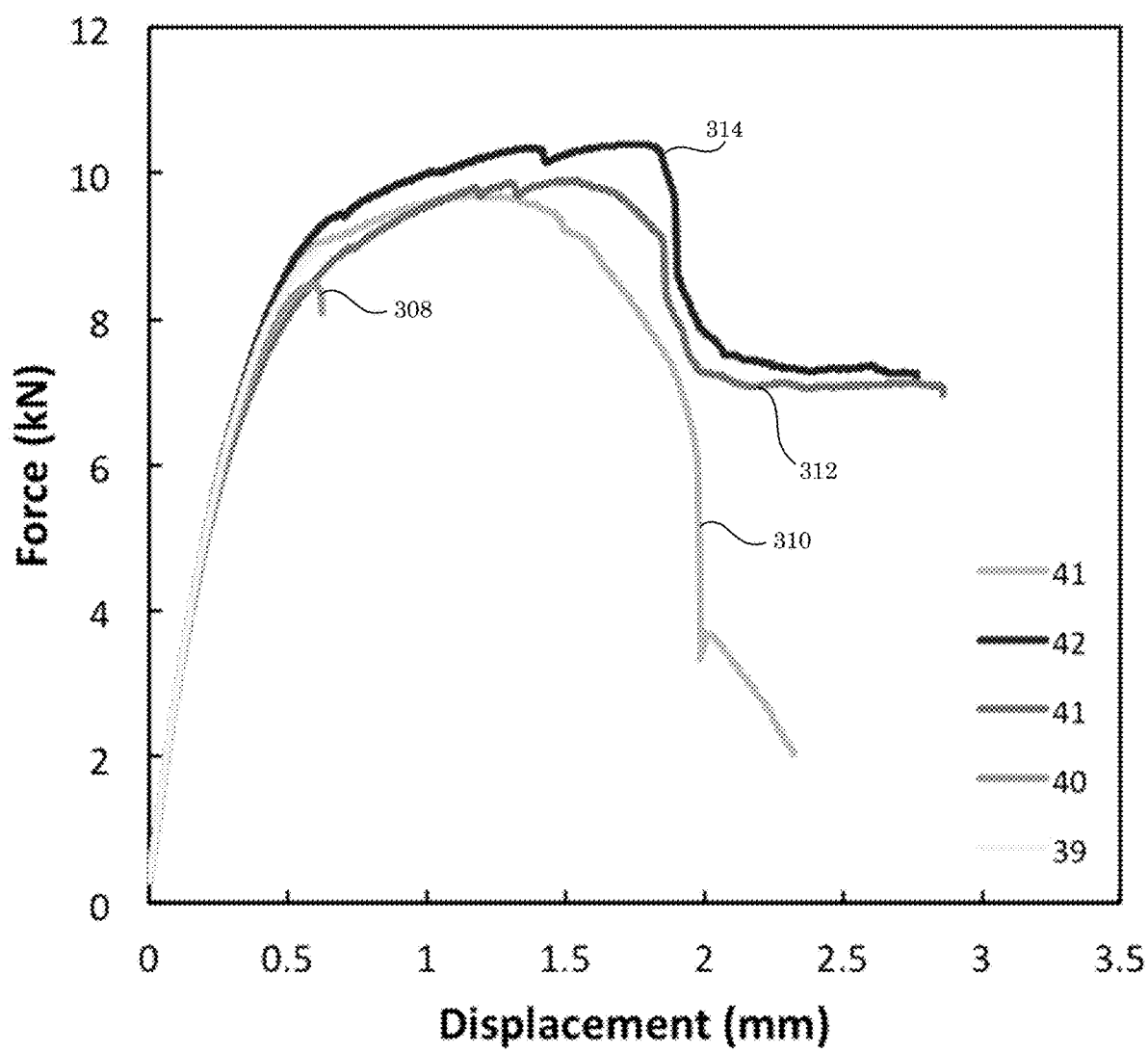
FIG. 20 shows a graph of force versus displacement of spot welded steel joints under tensile testing of double lap specimens, wherein reference numerals 308, 310, 312, and 314 indicate different spot welding parameters.
Figure 21:
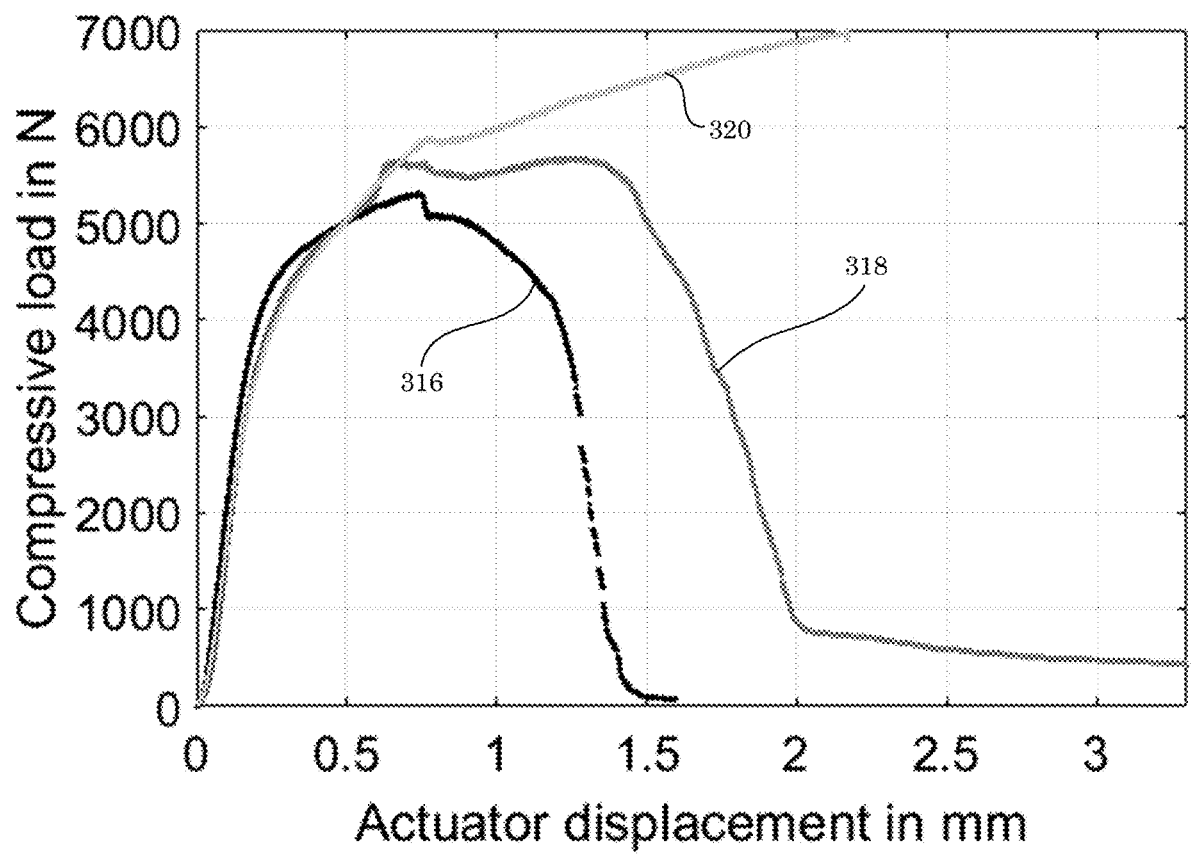
FIG. 21 shows a graph of compressive load versus actuator displacement curves of single spot-welded joints with different geometries tested with shear loader, and since not a double lap, force is about 50% shown in FIG. 20, wherein reference numerals are as follows: 320, inappropriate geometry leads to plastic deformation of steel sheet; 318, improvement in geometry; and 316, appropriate geometry for spot welded joints.

FIG. 20 shows a graph of force versus displacement of spot welded steel joints under tensile testing of double lap specimens (308,310,312,314: different spot welding parameters) FIG. 21 shows a graph of compressive load versus actuator displacement curves of single spot welded joints with different geometries tested with shear loader (since not double lap, force is about 50% shown in FIG. 20, 320: inappropriate geometry leads to plastic deformation of steel sheet, 318: improvement in geometry, 316: appropriate geometry for spot welded joints).

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A shear loader to produce a shear load on a sample, the shear loader comprising:
   a first shearer comprising:
      a first shearing face that provides a shearing plane;
      a first mating face disposed orthogonal to the first shearing face; and
      a first knife edge disposed along the shearing plane at an intersection of the first shearing face and the first mating face;
   a second shearer comprising:
      a second shearing face disposed along the shearing plane;
      a second mating face disposed orthogonal to the second shearing face; and
      a second knife edge disposed along the shearing plane at an intersection of the second shearing face and the second mating face,
      the first shearer and the second shearer having relative motion in a shear direction that is parallel to the shearing plane to provide the shear load to the sample along the shearing plane;
   a first load cell disposed on the first mating face of the first shearer and comprising a first load face to contact the sample;
   a second load cell disposed on the second mating face of the second shearer and comprising a second load face opposingly disposed to the first load face of the first load cell,
      the first load cell and the second load cell having relative motion in a load direction that is orthogonal to the shearing plane and orthogonal to the shear direction, such that relative motion the first load cell and the second load cell along the load direction subjects the sample to a side load along the load direction; and
   a sample region that receives sample and that is bounded by the first mating face, the second mating face, the first load face, and the second load face.

2. The shear loader of claim 1, further comprising a self-alignment jigger disposed on the first shearer and in mechanical communication with the second shearer and that provides linear motion between the first shearer and the second shearer.

3. The shear loader of claim 1, further comprising a self-alignment jigger disposed on the second shearer and in mechanical communication with the first shearer and that provides linear motion between the first shearer and the second shearer.

4. The shear loader of claim 1, further comprising a fixture coupler disposed on the first shearer and that provides coupling of the shear loader to a test machine.

5. The shear loader of claim 1, further comprising a fixture coupler disposed on the second shearer and that provides coupling of the shear loader to a test machine.

6. The shear loader of claim 1, wherein the shear loader produces pure mode II shear loading on the sample.

7. The shear loader of claim 1, wherein the shear loader produces mixed shear loading consisting essentially of mode I and mode II shear loading on the sample.

8. A process for performing pure mode II shear loading, the process comprising:
receiving a sample in a sample region of the shear loader of claim 1;
contacting a first shear face of the sample with the first mating face of the first shearer;
contacting a second shear face of the sample with the second mating face of the second shearer;
contacting a first load face of the sample with the first load face of the first load cell;
contacting a second load face of the sample with the second load face of the second load cell;
moving the first shearer relative to the second shearer in a linear direction along the shear direction; and
subjecting the sample to the shear load provided by the first knife edge of the first shearer and the second knife edge of the second shearer in an absence of a mode I or mode III force to perform pure mode II shear loading.

9. The process for performing pure mode II shear loading of claim 8, wherein the shear load subjected to the sample by the first knife edge of the first shearer and the second knife edge of the second shearer consists essentially of a quasi-static force.

10. The process for performing pure mode II shear loading of claim 8, wherein the shear load subjected to the sample by the first knife edge of the first shearer and the second knife edge of the second shearer comprises a dynamic force.

11. The process for performing pure mode II shear loading of claim 8, further comprising:
disposing the shear loader on a test machine comprising a universal tensile testing machine.

12. The process for performing pure mode II shear loading of claim 8, further comprising:
receiving reflected light from a viewing face of the sample with a digital image correlator; and
determining a strain on the sample from the reflected light, the strain being produced in response to subjecting the sample to the shear load.

13. The process for performing pure mode II shear loading of claim 8, further comprising:
completely fracturing the sample in response to subjecting the sample to the shear load.

14. A process for performing mixed mode I and mode II shear loading, the process comprising:
receiving a sample in a sample region of the shear loader of claim 1;
contacting a first shear face of the sample with the first mating face of the first shearer;
contacting a second shear face of the sample with the second mating face of the second shearer;
contacting a first load face of the sample with the first load face of the first load cell;
contacting a second load face of the sample with the second load face of the second load cell;
moving the first shearer relative to the second shearer in a linear direction along the shear direction;
subjecting the sample to the shear load provided by the first knife edge of the first shearer and the second knife edge of the second shearer; and
subjecting the sample to the side load provided by the first load cell to perform mixed mode I and mode II shear loading.

15. The process for performing mixed mode I and mode II shear loading of claim 14, wherein the shear load subjected to the sample by the first knife edge of the first shearer and the second knife edge of the second shearer consists essentially of a static force.

16. The process for performing mixed mode I and mode II shear loading of claim 14, wherein the shear load subjected to the sample by the first knife edge of the first shearer and the second knife edge of the second shearer comprises a dynamic force.

17. The process for performing mixed mode I and mode II shear loading of claim 14, further comprising:
disposing the shear loader on a test machine comprising a universal tensile testing machine.

18. The process for performing mixed mode I and mode II shear loading of claim 14, further comprising:
receiving reflected light from a viewing face of the sample with a digital image correlator; and
determining a strain on the sample from the reflected light, the strain being produced in response to subjecting the sample to the shear load and the side load.

19. The process for performing mixed mode I and mode II shear loading of claim 14, further comprising:
pulling on the sample via stress tab disposed on the sample.

20. The process for performing mixed mode I and mode II loading of claim 14, further comprising:
completely fracturing the sample in response to subjecting the sample to the side and shear load.

* * * * *